(12) United States Patent
Eibl

(10) Patent No.: US 12,378,647 B2
(45) Date of Patent: Aug. 5, 2025

(54) REDUCED CARBIDES FERROUS ALLOYS

(71) Applicant: Oerlikon Metco (US) Inc., Westbury, NY (US)

(72) Inventor: Cameron Eibl, La Jolla, CA (US)

(73) Assignee: Oerlikon Metco (US) Inc., Westbury, NY (US)

( * ) Notice: Subject to any disclaimer, the term of this patent is extended or adjusted under 35 U.S.C. 154(b) by 0 days.

(21) Appl. No.: 18/399,370

(22) Filed: Dec. 28, 2023

(65) Prior Publication Data

US 2024/0124961 A1    Apr. 18, 2024

Related U.S. Application Data

(63) Continuation of application No. 17/042,021, filed as application No. PCT/US2019/024541 on Mar. 28, 2019, now abandoned.

(Continued)

(51) Int. Cl.
*C22C 38/02* (2006.01)
*B22F 1/16* (2022.01)
(Continued)

(52) U.S. Cl.
CPC ............ *C22C 38/02* (2013.01); *B23K 26/342* (2015.10); *C22C 38/44* (2013.01); *C22C 38/54* (2013.01);
(Continued)

(58) Field of Classification Search
CPC ......... C22C 38/02; C22C 38/44; C22C 38/54; C22C 38/58; C22C 29/14; C22C 38/04; C22C 38/22; C22C 38/32; C22C 38/38; C22C 32/0047; C22C 33/0285; C22C 33/0292; B23K 26/342; B23K 2103/02; B23K 35/0261; B23K 35/308; C23C 4/10;
(Continued)

(56) References Cited

U.S. PATENT DOCUMENTS 2,043,952 A    6/1936 Ffield
2,156,306 A    5/1939 Rapatz
(Continued)

FOREIGN PATENT DOCUMENTS

CN    86102537    9/1987
CN    1033292    6/1989
(Continued)

OTHER PUBLICATIONS

Al-Aqeeli et al.: "Formation of an amorphous phase and its crystallization in the immiscible Nb—Zr system by mechanical alloying," Journal of Applied Physics 114, 153512, 2013.
(Continued)

*Primary Examiner* — Adil A. Siddiqui
(74) *Attorney, Agent, or Firm* — Knobbe, Martens, Olson & Bear, LLP

(57) ABSTRACT

Disclosed herein are embodiments of wear resistant alloys, such as ferrous alloys, that can have reduced carbide contents. In some embodiments, the alloys may have no carbides. In some, the alloy may have boride phases, such as phases having high Mo+W content and/or high Fe+Cr content. There can be reduced hardphases levels out of the specifically disclosed boride phases in some embodiments. In some embodiments, hypereutectic chromium borides can have limited incorporation into the disclosed alloys.

20 Claims, 3 Drawing Sheets

Related U.S. Application Data

(60) Provisional application No. 62/649,767, filed on Mar. 29, 2018.

(51) Int. Cl.
*B23K 26/342* (2014.01)
*C22C 29/14* (2006.01)
*C22C 38/44* (2006.01)
*C22C 38/54* (2006.01)
*C22C 38/58* (2006.01)
*C23C 4/10* (2016.01)
*C23C 4/12* (2016.01)

(52) U.S. Cl.
CPC ............... *C22C 38/58* (2013.01); *C23C 4/10* (2013.01); *C23C 4/12* (2013.01); *B22F 1/16* (2022.01); *C22C 29/14* (2013.01)

(58) Field of Classification Search
CPC ... C23C 4/12; C23C 4/067; B22F 1/16; B22F 3/115; B32B 15/01; B32B 15/011
See application file for complete search history.

(56) References Cited

U.S. PATENT DOCUMENTS

| | | |
|---|---|---|
| 2,507,195 A | 5/1950 | Winearls |
| 2,608,495 A | 8/1952 | Barry |
| 2,873,187 A | 2/1959 | Dyrkaez et al. |
| 2,936,229 A | 5/1960 | Shepard |
| 3,024,137 A | 3/1962 | Witherell |
| 3,113,021 A | 12/1963 | Witherell |
| 3,181,970 A | 5/1965 | Witherell et al. |
| 3,303,063 A | 2/1967 | Pietryka et al. |
| 3,448,241 A | 6/1969 | Buckingham et al. |
| 3,554,792 A | 1/1971 | Johnson |
| 3,650,734 A | 3/1972 | Kantor et al. |
| 3,663,214 A | 5/1972 | Moore |
| 3,724,016 A | 4/1973 | Kumar et al. |
| 3,819,364 A | 6/1974 | Frehn |
| 3,843,359 A | 10/1974 | Fiene et al. |
| 3,859,060 A | 1/1975 | Eiselstein et al. |
| 3,942,954 A | 3/1976 | Frehn |
| 3,975,612 A | 8/1976 | Nakazaki et al. |
| 4,010,309 A | 3/1977 | Peterson |
| 4,017,339 A | 4/1977 | Okuda et al. |
| 4,042,383 A | 8/1977 | Petersen et al. |
| 4,064,608 A | 12/1977 | Jaeger |
| 4,066,451 A | 1/1978 | Rudy |
| 4,110,514 A | 8/1978 | Nicholson |
| 4,214,145 A | 7/1980 | Zvanut et al. |
| 4,235,630 A | 11/1980 | Babu |
| 4,240,827 A | 12/1980 | Aihara |
| 4,255,709 A | 3/1981 | Zatsepium et al. |
| 4,277,108 A | 7/1981 | Wallace |
| 4,285,725 A | 8/1981 | Gysel |
| 4,297,135 A | 10/1981 | Giessen et al. |
| 4,318,733 A | 3/1982 | Ray et al. |
| 4,362,553 A | 12/1982 | Ray |
| 4,365,994 A | 12/1982 | Ray |
| 4,415,530 A | 11/1983 | Hunt |
| 4,419,130 A | 12/1983 | Slaughter |
| 4,576,653 A | 3/1986 | Ray |
| 4,596,282 A | 6/1986 | Maddy et al. |
| 4,606,977 A | 8/1986 | Dickson et al. |
| 4,635,701 A | 1/1987 | Sare et al. |
| 4,638,847 A | 1/1987 | Day |
| 4,639,576 A | 1/1987 | Shoemaker |
| 4,666,797 A | 5/1987 | Newman et al. |
| 4,673,550 A | 6/1987 | Dallaire et al. |
| 4,762,681 A | 8/1988 | Tassen et al. |
| 4,803,045 A | 2/1989 | Ohriner et al. |
| 4,806,394 A | 2/1989 | Steine |
| 4,818,307 A | 4/1989 | Mori et al. |
| 4,822,415 A | 4/1989 | Dorfman et al. |
| 4,888,153 A | 12/1989 | Yabuki |
| 4,919,728 A | 4/1990 | Kohl et al. |
| 4,943,488 A | 7/1990 | Sung et al. |
| 4,957,982 A | 9/1990 | Geddes |
| 4,966,626 A | 10/1990 | Fujiki et al. |
| 4,981,644 A | 1/1991 | Chang |
| 5,094,812 A | 3/1992 | Dulmaine et al. |
| 5,104,748 A | 4/1992 | Mori et al. |
| 5,141,571 A | 8/1992 | DuBois |
| 5,252,149 A | 10/1993 | Dolman |
| 5,280,726 A | 1/1994 | Urbanic et al. |
| 5,306,358 A | 4/1994 | Lai et al. |
| 5,375,759 A | 12/1994 | Hiraishi et al. |
| 5,424,101 A | 6/1995 | Atkins |
| 5,495,837 A | 3/1996 | Mitsuhashi |
| 5,567,251 A | 10/1996 | Peker et al. |
| 5,570,636 A | 11/1996 | Lewis |
| 5,618,451 A | 4/1997 | Ni |
| 5,820,939 A | 10/1998 | Popoola et al. |
| 5,837,326 A | 11/1998 | Dallaire |
| 5,843,243 A | 12/1998 | Kawasaki et al. |
| 5,858,558 A | 1/1999 | Zhao et al. |
| 5,861,605 A | 1/1999 | Ogawa et al. |
| 5,907,017 A | 5/1999 | Ober et al. |
| 5,911,949 A | 6/1999 | Ninomiya et al. |
| 5,935,350 A | 8/1999 | Raghu et al. |
| 5,942,289 A | 8/1999 | Jackson |
| 5,976,704 A | 11/1999 | McCune |
| 5,988,302 A | 11/1999 | Sreshta et al. |
| 6,071,324 A | 6/2000 | Laul et al. |
| 6,117,493 A | 9/2000 | North |
| 6,171,222 B1 | 1/2001 | Lakeland et al. |
| 6,210,635 B1 | 4/2001 | Jackson et al. |
| 6,232,000 B1 | 5/2001 | Singh et al. |
| 6,238,843 B1 | 5/2001 | Ray |
| 6,306,524 B1 | 10/2001 | Spitsberg et al. |
| 6,326,582 B1 | 12/2001 | North |
| 6,331,688 B1 | 12/2001 | Hallén et al. |
| 6,332,936 B1 | 12/2001 | Hajaligo et al. |
| 6,375,895 B1 | 4/2002 | Daemen |
| 6,398,103 B2 | 6/2002 | Hasz et al. |
| 6,441,334 B1 | 8/2002 | Aida et al. |
| 6,582,126 B2 | 6/2003 | North |
| 6,608,286 B2 | 8/2003 | Jiang |
| 6,669,790 B1 | 12/2003 | Gundlach et al. |
| 6,689,234 B2 | 2/2004 | Branagan |
| 6,702,905 B1 | 3/2004 | Qiao et al. |
| 6,702,906 B2 | 3/2004 | Ogawa et al. |
| 6,750,430 B2 | 6/2004 | Kelly |
| 7,052,561 B2 | 5/2006 | Lu et al. |
| 7,219,727 B2 | 5/2007 | Slack et al. |
| 7,285,151 B2 | 10/2007 | Sjodin et al. |
| 7,361,411 B2 | 4/2008 | Daemen et al. |
| 7,491,910 B2 | 2/2009 | Kapoor et al. |
| 7,507,305 B2 | 3/2009 | Kawasaki et al. |
| 7,553,382 B2 | 6/2009 | Branagan et al. |
| 7,569,286 B2 | 8/2009 | Daemen et al. |
| 7,754,152 B2 | 7/2010 | Riebel et al. |
| 7,776,451 B2 | 8/2010 | Jiang et al. |
| 7,935,198 B2 | 5/2011 | Branagan et al. |
| 8,070,894 B2 | 12/2011 | Branagan |
| 8,097,095 B2 | 1/2012 | Branagan |
| 8,153,935 B2 | 4/2012 | Jang et al. |
| 8,187,529 B2 | 5/2012 | Powell |
| 8,187,725 B2 | 5/2012 | Kiser et al. |
| 8,268,453 B2 | 9/2012 | Dallaire |
| 8,474,541 B2 | 7/2013 | Branagan et al. |
| 8,562,759 B2 | 10/2013 | Cheney et al. |
| 8,562,760 B2 | 10/2013 | Cheney et al. |
| 8,640,941 B2 | 2/2014 | Cheney |
| 8,647,449 B2 | 2/2014 | Cheney et al. |
| 8,658,934 B2 | 2/2014 | Branagan et al. |
| 8,662,143 B1 | 3/2014 | Foster |
| 8,669,491 B2 | 3/2014 | Menon et al. |
| 8,702,835 B2 | 4/2014 | Yu et al. |
| 8,703,046 B2 | 4/2014 | Hanejko et al. |
| 8,704,134 B2 | 4/2014 | Branagan et al. |
| 8,777,090 B2 | 7/2014 | Miller et al. |
| 8,801,872 B2 | 8/2014 | Wright et al. |

(56) References Cited

U.S. PATENT DOCUMENTS

| | | |
|---|---|---|
| 8,808,471 B2 | 8/2014 | Wright et al. |
| 8,858,675 B2 | 10/2014 | Larsson |
| 8,870,997 B2 | 10/2014 | Klekovkin et al. |
| 8,901,022 B2 | 12/2014 | Francy et al. |
| 8,911,662 B2 | 12/2014 | Larsson |
| 8,920,938 B2 | 12/2014 | Hesse et al. |
| 8,961,869 B2 | 2/2015 | Kapoor et al. |
| 8,973,806 B2 | 3/2015 | Cheney |
| 8,992,659 B2 | 3/2015 | Larsson et al. |
| 9,051,635 B2 | 6/2015 | Jou |
| 9,095,932 B2 | 8/2015 | Miller et al. |
| 9,145,598 B2 | 9/2015 | Oshchepkov |
| 9,174,293 B2 | 11/2015 | Meyer |
| 9,193,011 B2 | 11/2015 | Mars et al. |
| 9,233,419 B2 | 1/2016 | Gries |
| 9,255,309 B2 | 2/2016 | Aimone |
| 9,309,585 B2 | 4/2016 | Cheney et al. |
| 9,314,848 B2 | 4/2016 | Larsson |
| 9,340,855 B2 | 5/2016 | Schade et al. |
| 9,394,591 B2 | 7/2016 | Deodeshmukh et al. |
| 9,399,907 B2 | 7/2016 | Mo et al. |
| 9,469,890 B2 | 10/2016 | Bengtsson |
| 9,540,711 B2 | 1/2017 | Fifield |
| 9,580,773 B2 | 2/2017 | Aimone et al. |
| 9,631,262 B2 | 4/2017 | Wright et al. |
| 9,724,786 B2 | 8/2017 | Postle et al. |
| 9,725,793 B2 | 8/2017 | Aimone et al. |
| 9,738,959 B2 | 8/2017 | Cheney et al. |
| 9,745,648 B2 | 8/2017 | Olserius et al. |
| 9,802,387 B2 | 10/2017 | Cheney |
| 9,815,148 B2 | 11/2017 | Postle |
| 9,816,164 B2 | 11/2017 | Larsson et al. |
| 9,821,372 B2 | 11/2017 | Gries |
| 9,834,829 B1 | 12/2017 | Aimone et al. |
| 9,845,520 B2 | 12/2017 | Wright et al. |
| 9,856,546 B2 | 1/2018 | Fischer et al. |
| 9,869,132 B2 | 1/2018 | Wyble et al. |
| 9,879,333 B2 | 1/2018 | Gerk et al. |
| 9,908,816 B2 | 3/2018 | Champion et al. |
| 9,914,987 B2 | 3/2018 | Snyder et al. |
| 9,919,358 B2 | 3/2018 | Gries |
| 9,951,413 B2 | 4/2018 | Billieres |
| 9,957,590 B2 | 5/2018 | Mars et al. |
| 9,957,592 B2 | 5/2018 | Aimone et al. |
| 9,970,091 B2 | 5/2018 | Crook et al. |
| 9,994,935 B2 | 6/2018 | Wolverton et al. |
| 10,100,388 B2 | 10/2018 | Cheney |
| 10,105,796 B2 | 10/2018 | Eibl |
| 10,125,412 B2 | 11/2018 | Kaner et al. |
| 10,173,290 B2 | 1/2019 | Cheney |
| 10,252,919 B2 | 4/2019 | Billieres et al. |
| 10,329,647 B2 | 6/2019 | Cheney |
| RE47,529 E | 7/2019 | Johnson |
| 10,351,921 B2 | 7/2019 | Snyder et al. |
| 10,351,922 B2 | 7/2019 | Snyder et al. |
| 10,351,938 B2 | 7/2019 | Schade et al. |
| 10,358,699 B2 | 7/2019 | Srivastava et al. |
| 10,358,701 B2 | 7/2019 | Reed et al. |
| 10,370,740 B2 | 8/2019 | Reed et al. |
| 10,384,313 B2 | 8/2019 | Persson |
| 10,400,314 B2 | 9/2019 | Aimone et al. |
| 10,458,006 B2 | 10/2019 | Bengtsson |
| 10,465,267 B2 | 11/2019 | Cheney |
| 10,465,268 B2 | 11/2019 | Bergman |
| 10,465,269 B2 | 11/2019 | Cheney |
| 10,471,503 B2 | 11/2019 | Wright et al. |
| 10,513,758 B2 | 12/2019 | Mars |
| 10,519,529 B2 | 12/2019 | Wright et al. |
| 10,550,460 B2 | 2/2020 | Nilsson et al. |
| 10,577,680 B2 | 3/2020 | Srivastava et al. |
| 10,597,757 B2 | 3/2020 | Gong et al. |
| 10,702,918 B2 | 7/2020 | Hu |
| 10,702,924 B2 | 7/2020 | Szabo et al. |
| 10,711,329 B2 | 7/2020 | Wright et al. |
| 10,731,236 B2 | 8/2020 | Kaner et al. |
| 10,745,782 B2 | 8/2020 | Wolverton et al. |
| 10,851,444 B2 | 12/2020 | Vecchio et al. |
| 10,851,565 B1 | 12/2020 | Krueger |
| 10,872,682 B2 | 12/2020 | Reed et al. |
| 10,934,608 B2 | 3/2021 | Gu |
| 10,941,473 B2 | 3/2021 | Snyder |
| 10,954,588 B2 | 3/2021 | Cheney |
| 11,001,912 B2 | 5/2021 | Aimone et al. |
| 11,033,998 B2 | 6/2021 | Kavanaugh et al. |
| 11,085,102 B2 | 8/2021 | Cheney |
| 11,111,912 B2 | 9/2021 | Cheney |
| 11,114,226 B2 | 9/2021 | Jayaraman et al. |
| 11,118,247 B2 | 9/2021 | Gong et al. |
| 11,124,429 B2 | 9/2021 | Gore et al. |
| 11,130,205 B2 | 9/2021 | Cheney |
| 11,174,538 B2 | 11/2021 | Kaner et al. |
| 11,353,957 B2 | 2/2022 | Eibl |
| 11,261,506 B2 | 3/2022 | Xu et al. |
| 11,279,996 B2 | 3/2022 | Cheney et al. |
| 11,325,189 B2 | 5/2022 | Imano et al. |
| 11,326,239 B2 | 5/2022 | Cao et al. |
| 11,359,268 B2 | 6/2022 | Cao et al. |
| 11,370,198 B2 | 6/2022 | Maroli et al. |
| 11,389,872 B2 | 7/2022 | Stawovy et al. |
| 11,401,582 B2 | 8/2022 | Shibayama et al. |
| 11,401,585 B2 | 8/2022 | Gong et al. |
| 11,401,592 B2 | 8/2022 | Wei |
| 11,414,728 B2 | 8/2022 | Wang et al. |
| 11,453,939 B2 | 9/2022 | Pike |
| 11,499,208 B2 | 11/2022 | Wang et al. |
| 11,499,212 B2 | 11/2022 | Lu et al. |
| 11,505,841 B2 | 11/2022 | Tast et al. |
| 11,505,849 B2 | 11/2022 | Hericher et al. |
| 11,566,313 B2 | 1/2023 | Ota et al. |
| 11,613,795 B2 | 3/2023 | Wang et al. |
| 11,655,528 B2 | 5/2023 | Nymann |
| 11,667,535 B2 | 6/2023 | Turner et al. |
| 11,667,993 B2 | 6/2023 | Hericher et al. |
| 11,685,979 B2 | 6/2023 | Larsson et al. |
| 11,701,730 B2 | 7/2023 | Keegan et al. |
| 11,702,724 B2 | 7/2023 | Crook et al. |
| 11,738,389 B2 | 8/2023 | Hailiang et al. |
| 11,780,003 B2 | 10/2023 | Wright et al. |
| 11,780,014 B2 | 10/2023 | Behera et al. |
| 11,814,713 B2 | 11/2023 | Wu et al. |
| 2001/0019781 A1 | 9/2001 | Hasz |
| 2002/0054972 A1 | 5/2002 | Charpentier et al. |
| 2002/0098298 A1 | 7/2002 | Bolton et al. |
| 2002/0148533 A1 | 10/2002 | Kim et al. |
| 2002/0159914 A1 | 10/2002 | Yeh |
| 2003/0013171 A1 | 1/2003 | Yang et al. |
| 2004/0001966 A1 | 1/2004 | Subramanian |
| 2004/0062677 A1 | 4/2004 | Chabenat et al. |
| 2004/0079742 A1 | 4/2004 | Kelly |
| 2004/0115086 A1 | 6/2004 | Chabenat et al. |
| 2004/0206726 A1 | 10/2004 | Daemen et al. |
| 2005/0031892 A1 | 2/2005 | Mazumder |
| 2005/0047952 A1 | 3/2005 | Coleman |
| 2005/0109431 A1 | 5/2005 | Kernan et al. |
| 2005/0139294 A1 | 6/2005 | Kim et al. |
| 2005/0164016 A1 | 7/2005 | Branagan et al. |
| 2005/0193861 A1 | 9/2005 | Sato et al. |
| 2006/0063020 A1 | 3/2006 | Barbezat |
| 2006/0093752 A1 | 5/2006 | Darolia et al. |
| 2006/0163217 A1 | 7/2006 | Jiang |
| 2006/0191606 A1 | 8/2006 | Ogawa et al. |
| 2006/0260583 A1 | 11/2006 | Abi-Akar et al. |
| 2007/0026159 A1 | 2/2007 | Deem |
| 2007/0029295 A1 | 2/2007 | Branagan |
| 2007/0090167 A1 | 4/2007 | Arjakine et al. |
| 2007/0125458 A1 | 6/2007 | Kawasaki et al. |
| 2007/0187369 A1 | 8/2007 | Menon et al. |
| 2007/0219053 A1 | 9/2007 | Barufka et al. |
| 2007/0253856 A1 | 11/2007 | Vecchio et al. |
| 2007/0284018 A1 | 12/2007 | Hamano et al. |
| 2008/0001115 A1 | 1/2008 | Qiao et al. |
| 2008/0031769 A1 | 2/2008 | Yeh |
| 2008/0083391 A1 | 4/2008 | Sawada |
| 2008/0149397 A1 | 6/2008 | Overstreet |

(56) References Cited

U.S. PATENT DOCUMENTS

| | | |
|---|---|---|
| 2008/0199684 A1 | 8/2008 | Apte et al. |
| 2008/0226936 A1 | 9/2008 | Furushima et al. |
| 2008/0241580 A1 | 10/2008 | Kiser et al. |
| 2008/0241584 A1 | 10/2008 | Daemen et al. |
| 2008/0253918 A1 | 10/2008 | Liang |
| 2009/0017328 A1 | 1/2009 | Katoh et al. |
| 2009/0075057 A1 | 3/2009 | Kulkarni |
| 2009/0075101 A1 | 3/2009 | Kulkarni et al. |
| 2009/0123765 A1 | 5/2009 | Branagan |
| 2009/0252636 A1 | 10/2009 | Christopherson, Jr. et al. |
| 2009/0258250 A1 | 10/2009 | Daemen et al. |
| 2009/0285715 A1 | 11/2009 | Arjakine et al. |
| 2010/0009089 A1 | 1/2010 | Junod et al. |
| 2010/0028706 A1 | 2/2010 | Hornschu et al. |
| 2010/0044348 A1 | 2/2010 | Buchmann |
| 2010/0047622 A1 | 2/2010 | Fischer et al. |
| 2010/0055495 A1 | 3/2010 | Sjodin |
| 2010/0101780 A1 | 4/2010 | Ballew et al. |
| 2010/0132408 A1 | 6/2010 | Billieres |
| 2010/0136361 A1 | 6/2010 | Osuki et al. |
| 2010/0155236 A1 | 6/2010 | Lee et al. |
| 2010/0159136 A1 | 6/2010 | Lee et al. |
| 2010/0166594 A1 | 7/2010 | Hirata et al. |
| 2010/0189588 A1 | 7/2010 | Kawatsu et al. |
| 2010/0192476 A1 | 8/2010 | Theisen et al. |
| 2010/0258217 A1 | 10/2010 | Kuehmann |
| 2011/0004069 A1 | 1/2011 | Ochs et al. |
| 2011/0031222 A1 | 2/2011 | Branagan et al. |
| 2011/0048587 A1 | 3/2011 | Vecchio et al. |
| 2011/0064963 A1 | 3/2011 | Cheney et al. |
| 2011/0139761 A1 | 6/2011 | Sugahara et al. |
| 2011/0142713 A1 | 6/2011 | Kawasaki et al. |
| 2011/0162612 A1 | 7/2011 | Qiao et al. |
| 2011/0171485 A1 | 7/2011 | Kawamoto et al. |
| 2011/0220415 A1 | 9/2011 | Jin et al. |
| 2012/0055903 A1 | 3/2012 | Izutani et al. |
| 2012/0100390 A1 | 4/2012 | Kuroda |
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0258273 A1 | 10/2012 | Churchill et al. |
| 2012/0288400 A1 | 11/2012 | Hirata et al. |
| 2013/0039800 A1 | 2/2013 | Dolman |
| 2013/0094900 A1 | 4/2013 | Folkmann et al. |
| 2013/0108502 A1 | 5/2013 | Bei |
| 2013/0167965 A1 | 7/2013 | Cheney et al. |
| 2013/0171367 A1 | 7/2013 | Kusinski et al. |
| 2013/0174612 A1 | 7/2013 | Linnot et al. |
| 2013/0216722 A1 | 8/2013 | Kusinski et al. |
| 2013/0220523 A1 | 8/2013 | Cheney |
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0266820 A1 | 10/2013 | Kusinski et al. |
| 2013/0294962 A1 | 11/2013 | Wallin et al. |
| 2014/0024509 A1 | 1/2014 | Gerschefske |
| 2014/0044587 A1 | 2/2014 | Crook et al. |
| 2014/0044617 A1 | 2/2014 | Dreisinger |
| 2014/0060707 A1 | 3/2014 | Wright et al. |
| 2014/0066851 A1 | 3/2014 | Cheney, II |
| 2014/0116575 A1 | 5/2014 | Cheney et al. |
| 2014/0131338 A1 | 5/2014 | Postle |
| 2014/0190594 A1 | 7/2014 | Branagan et al. |
| 2014/0219859 A1 | 8/2014 | Cheney |
| 2014/0234154 A1 | 8/2014 | Cheney et al. |
| 2014/0248509 A1 | 9/2014 | Cheney et al. |
| 2014/0263248 A1 | 9/2014 | Postle |
| 2014/0272388 A1 | 9/2014 | Knight et al. |
| 2014/0295194 A1 | 10/2014 | Yoshitaka et al. |
| 2014/0322064 A1 | 10/2014 | Gerk et al. |
| 2014/0356223 A1 | 12/2014 | Nilsson et al. |
| 2015/0004337 A1 | 1/2015 | Zimmermann et al. |
| 2015/0075681 A1 | 3/2015 | Wright et al. |
| 2015/0086413 A1 | 3/2015 | Wolverton et al. |
| 2015/0106035 A1 | 4/2015 | Vecchio et al. |
| 2015/0114525 A1 | 4/2015 | Valls Anglés |
| 2015/0118098 A1 | 4/2015 | Valls |
| 2015/0122552 A1 | 5/2015 | Wang et al. |
| 2015/0252631 A1 | 9/2015 | Miller |
| 2015/0267283 A1 | 9/2015 | Dolman |
| 2015/0275341 A1 | 10/2015 | Cheney |
| 2015/0284817 A1 | 10/2015 | Snyder et al. |
| 2015/0284829 A1 | 10/2015 | Cheney |
| 2015/0307968 A1 | 10/2015 | Mars et al. |
| 2015/0328680 A1 | 11/2015 | Tuffile |
| 2015/0367454 A1 | 12/2015 | Cheney |
| 2016/0001368 A1 | 1/2016 | Gries et al. |
| 2016/0002752 A1 | 1/2016 | Srivastava et al. |
| 2016/0002764 A1 | 1/2016 | Gries et al. |
| 2016/0017463 A1 | 1/2016 | Cheney |
| 2016/0024628 A1 | 1/2016 | Cheney |
| 2016/0040262 A1 | 2/2016 | Snyder et al. |
| 2016/0083830 A1 | 3/2016 | Cheney |
| 2016/0114392 A1 | 4/2016 | Berg et al. |
| 2016/0138144 A1 | 5/2016 | Olsérius |
| 2016/0144463 A1 | 5/2016 | Hellsten et al. |
| 2016/0195216 A1 | 7/2016 | Bondil et al. |
| 2016/0201169 A1 | 7/2016 | Vecchio |
| 2016/0201170 A1 | 7/2016 | Vecchio |
| 2016/0215374 A1 | 7/2016 | Schade et al. |
| 2016/0222490 A1 | 8/2016 | Wright et al. |
| 2016/0243616 A1 | 8/2016 | Gries |
| 2016/0258044 A1 | 9/2016 | Litström et al. |
| 2016/0271736 A1 | 9/2016 | Han et al. |
| 2016/0289001 A1 | 10/2016 | Shibata et al. |
| 2016/0289798 A1 | 10/2016 | Deodeshmukh et al. |
| 2016/0289799 A1 | 10/2016 | Crook et al. |
| 2016/0289803 A1 | 10/2016 | Cheney |
| 2016/0329139 A1 | 11/2016 | Jayaraman |
| 2016/0376686 A1 | 12/2016 | Jou |
| 2017/0009324 A1 | 1/2017 | Crook et al. |
| 2017/0014865 A1 | 1/2017 | Kusinski et al. |
| 2017/0022588 A1 | 1/2017 | Tang et al. |
| 2017/0044646 A1 | 2/2017 | Gong et al. |
| 2017/0145547 A1 | 5/2017 | Saal et al. |
| 2017/0253950 A1 | 9/2017 | Shinohara |
| 2017/0275740 A1 | 9/2017 | Bergman |
| 2018/0016664 A1 | 1/2018 | Hu |
| 2018/0021894 A1 | 1/2018 | Persoon et al. |
| 2018/0066343 A1 | 3/2018 | Bengtsson |
| 2018/0066345 A1 | 3/2018 | Cheney et al. |
| 2018/0094343 A1 | 4/2018 | Gerk et al. |
| 2018/0099877 A1 | 4/2018 | Chang et al. |
| 2018/0135143 A1 | 5/2018 | Snyder et al. |
| 2018/0195156 A1 | 7/2018 | Reed et al. |
| 2018/0216212 A1 | 8/2018 | Reed et al. |
| 2018/0230016 A1 | 8/2018 | Kaner et al. |
| 2018/0230578 A1 | 8/2018 | Srivastava et al. |
| 2018/0258515 A1 | 9/2018 | Jin |
| 2018/0265949 A1 | 9/2018 | Wolverton et al. |
| 2018/0272423 A1 | 9/2018 | Hu |
| 2019/0017154 A1 | 1/2019 | Kaner et al. |
| 2019/0024217 A1 | 1/2019 | Yolton |
| 2019/0055860 A1 | 2/2019 | Jones |
| 2019/0071318 A1 | 3/2019 | Kaner et al. |
| 2019/0084039 A1 | 3/2019 | Hu |
| 2019/0177820 A1 | 6/2019 | Larsson |
| 2019/0234151 A1 | 8/2019 | Olsen et al. |
| 2019/0300374 A1 | 10/2019 | Shevchenko et al. |
| 2019/0309399 A1 | 10/2019 | Badwe |
| 2019/0323107 A1 | 10/2019 | Srivastava et al. |
| 2019/0368014 A1 | 12/2019 | Liimatainen |
| 2019/0376165 A1 | 12/2019 | Wen |
| 2020/0001367 A1 | 1/2020 | Duffy et al. |
| 2020/0005975 A1 | 1/2020 | Jayaraman et al. |
| 2020/0048743 A1 | 2/2020 | Gong et al. |
| 2020/0063238 A1 | 2/2020 | Yolton |
| 2020/0063239 A1 | 2/2020 | Xu et al. |
| 2020/0172998 A1 | 6/2020 | Crudden et al. |
| 2020/0189918 A1 | 6/2020 | Saeuberlich et al. |
| 2020/0316718 A1 | 10/2020 | Smathers |
| 2020/0325561 A1 | 10/2020 | Kaner |
| 2020/0385845 A1 | 12/2020 | Gong |
| 2021/0040585 A1 | 2/2021 | Alabort |

(56) References Cited

U.S. PATENT DOCUMENTS

| | | | |
|---|---|---|---|
| 2021/0062305 A1 | 3/2021 | Fang |
| 2021/0164081 A1 | 6/2021 | Eibl |
| 2021/0180157 A1 | 6/2021 | Bracci |
| 2021/0180162 A1 | 6/2021 | Vecchio |
| 2021/0180170 A1 | 6/2021 | Pike |
| 2021/0197524 A1 | 7/2021 | Maroli et al. |
| 2021/0222275 A1 | 7/2021 | Saboo et al. |
| 2021/0246537 A1 | 8/2021 | Maroli et al. |
| 2021/0254202 A1 | 8/2021 | Gong et al. |
| 2021/0262050 A1 | 8/2021 | Oshchepkov et al. |
| 2021/0286079 A1 | 9/2021 | Vecchio |
| 2021/0387920 A1 | 12/2021 | Bouttes et al. |
| 2021/0402475 A1 | 12/2021 | Taneike et al. |
| 2022/0025492 A1 | 1/2022 | Schade et al. |
| 2022/0041449 A1 | 2/2022 | Larsson et al. |
| 2022/0081745 A1 | 3/2022 | Komai et al. |
| 2022/0165463 A1 | 5/2022 | Vidarsson et al. |
| 2022/0219231 A1 | 7/2022 | Eibl |
| 2022/0220583 A1 | 7/2022 | Ota et al. |
| 2022/0220584 A1 | 7/2022 | Wang et al. |
| 2022/0251697 A1 | 8/2022 | Eibl |
| 2022/0258289 A1 | 8/2022 | Vecchio |
| 2022/0259712 A1 | 8/2022 | Bracci |
| 2022/0274168 A1 | 9/2022 | Sobu |
| 2022/0404035 A1 | 12/2022 | Gattei |
| 2023/0043638 A1 | 2/2023 | Frankel et al. |
| 2023/0070692 A1 | 3/2023 | Ota et al. |
| 2023/0084878 A1 | 3/2023 | Wang et al. |
| 2023/0091193 A1 | 3/2023 | Chang |
| 2023/0091911 A1 | 3/2023 | Maroli et al. |
| 2023/0125609 A1 | 4/2023 | Schade et al. |
| 2023/0134452 A1 | 5/2023 | Saboo et al. |
| 2023/0175101 A1 | 6/2023 | Shinzawa et al. |
| 2023/0193439 A1 | 6/2023 | Forsik et al. |
| 2023/0235420 A1 | 7/2023 | Kesti et al. |
| 2023/0235425 A1 | 7/2023 | Kesti et al. |
| 2023/0250519 A1 | 8/2023 | Larsson et al. |
| 2023/0272496 A1 | 8/2023 | Nakamura et al. |
| 2023/0347438 A1 | 11/2023 | Miller et al. |

FOREIGN PATENT DOCUMENTS

| | | |
|---|---|---|
| CN | 1225629 C | 11/2005 |
| CN | 101016603 | 8/2007 |
| CN | 101310282 | 11/2008 |
| CN | 101368239 | 2/2009 |
| CN | 101558174 | 10/2009 |
| CN | 101948994 | 1/2011 |
| CN | 101994076 | 3/2011 |
| CN | 102233490 A | 11/2011 |
| CN | 102286702 | 12/2011 |
| CN | 102357750 A | 2/2012 |
| CN | 102936724 | 2/2013 |
| CN | 103628017 | 3/2014 |
| CN | 103785967 | 5/2014 |
| CN | 104093510 | 10/2014 |
| CN | 104233179 | 12/2014 |
| CN | 104625473 | 5/2015 |
| CN | 104694840 | 6/2015 |
| CN | 104805391 | 7/2015 |
| CN | 105057913 | 11/2015 |
| CN | 105483539 | 4/2016 |
| CN | 106119838 | 11/2016 |
| CN | 108607983 | 10/2018 |
| DE | 27 54 437 | 7/1979 |
| DE | 33 20 513 | 12/1983 |
| DE | 42 02 828 | 8/1993 |
| DE | 4411296 | 7/1995 |
| DE | 10 320 397 A1 | 12/2004 |
| DE | 10329912 | 6/2005 |
| DE | 102014013538 | 4/2015 |
| EP | 0 057 242 | 8/1982 |
| EP | 0 346 293 | 12/1989 |
| EP | 0 365 884 | 5/1990 |
| EP | 0 774 528 | 5/1997 |
| EP | 0 740 591 | 3/1999 |
| EP | 1 077 268 | 2/2001 |
| EP | 0 939 139 | 10/2001 |
| EP | 1 270 755 | 1/2003 |
| EP | 1 279 748 | 1/2003 |
| EP | 1 279 749 | 1/2003 |
| EP | 1 120 472 | 7/2003 |
| EP | 1 477 579 | 11/2004 |
| EP | 1 361 288 | 9/2006 |
| EP | 1 721 999 | 11/2006 |
| EP | 1 857 204 | 11/2007 |
| EP | 1 694 876 | 1/2008 |
| EP | 1 953 252 | 8/2008 |
| EP | 2 050 533 | 4/2009 |
| EP | 2 305 415 | 4/2011 |
| EP | 2 388 345 | 11/2011 |
| EP | 2 628 825 | 8/2013 |
| EP | 2 639 323 | 9/2013 |
| EP | 2 660 342 | 11/2013 |
| EP | 2 072 627 | 4/2014 |
| EP | 2 730 355 | 5/2014 |
| EP | 2 743 361 | 6/2014 |
| EP | 2 104 753 | 7/2014 |
| EP | 2 777 869 | 9/2014 |
| EP | 2 778 247 | 9/2014 |
| EP | 2 873 747 | 5/2015 |
| EP | 2 563 942 | 10/2015 |
| EP | 2 064 359 | 4/2016 |
| EP | 3 034 211 | 6/2016 |
| EP | 3 034 637 B1 | 6/2016 |
| EP | 2 235 225 | 10/2016 |
| EP | 3 093 858 | 11/2016 |
| EP | 2 659 014 | 4/2017 |
| EP | 3 156 155 | 4/2017 |
| EP | 2 147 445 | 5/2017 |
| EP | 2 252 419 | 6/2017 |
| EP | 2 265 559 | 6/2017 |
| EP | 2 329 507 | 6/2017 |
| EP | 2 285 996 | 8/2017 |
| EP | 3 211 108 | 8/2017 |
| EP | 1 700 319 | 10/2017 |
| EP | 2 207 907 | 12/2017 |
| EP | 2 788 136 | 1/2018 |
| EP | 2 414 554 B1 | 2/2018 |
| EP | 3 145 660 | 4/2018 |
| EP | 2 432 908 B1 | 5/2018 |
| EP | 2 181 199 | 8/2018 |
| EP | 2 477 784 | 8/2018 |
| EP | 2 695 171 | 8/2018 |
| EP | 3 354 758 | 8/2018 |
| EP | 1 799 380 | 9/2018 |
| EP | 3 266 892 | 10/2018 |
| EP | 3 444 452 | 2/2019 |
| EP | 2 265 739 | 6/2019 |
| EP | 3 259 095 | 6/2019 |
| EP | 1 844 172 | 7/2019 |
| EP | 3 517 642 | 7/2019 |
| EP | 3 115 472 | 10/2019 |
| EP | 3 552 740 | 10/2019 |
| EP | 2 155 921 | 11/2019 |
| EP | 3 350 354 | 2/2020 |
| EP | 3 354 764 | 3/2020 |
| EP | 3 149 216 | 4/2020 |
| EP | 2 403 966 B1 | 5/2020 |
| EP | 3 362 210 | 5/2020 |
| EP | 3 134 558 | 7/2020 |
| EP | 3 514 253 | 10/2020 |
| EP | 3 333 275 | 11/2020 |
| EP | 3 653 736 | 12/2020 |
| EP | 3 411 169 | 1/2021 |
| EP | 1 848 836 B1 | 4/2021 |
| EP | 3 822 007 | 5/2021 |
| EP | 2 671 669 | 6/2021 |
| EP | 3 991 879 | 5/2022 |
| EP | 4 116 444 | 1/2023 |
| EP | 4 116 445 | 1/2023 |
| EP | 4 180 225 | 5/2023 |
| EP | 4 180 544 | 5/2023 |
| FR | 2055735 | 4/1971 |

(56) References Cited

FOREIGN PATENT DOCUMENTS

| | | |
|---|---|---|
| FR | 2218797 | 9/1974 |
| GB | 465999 | 5/1937 |
| GB | 956740 | 4/1964 |
| GB | 1073621 | 6/1967 |
| GB | 1371948 | 10/1974 |
| GB | 2153846 A | 8/1985 |
| GB | 2273109 | 6/1994 |
| GB | 2546809 | 5/2018 |
| GB | 2579580 | 7/2020 |
| GB | 2567492 | 9/2020 |
| GB | 2584654 | 12/2020 |
| GB | 2584905 | 12/2020 |
| IN | MUMNP-2003-00842 | 4/2005 |
| JP | 43-019745 | 8/1968 |
| JP | 45-026214 | 10/1970 |
| JP | 47-1685 | 1/1972 |
| JP | 49-056839 | 6/1974 |
| JP | 51-061424 | 5/1976 |
| JP | 55-122848 | 9/1980 |
| JP | 58-132393 | 8/1983 |
| JP | 59-16951 | 1/1984 |
| JP | 59-16952 | 1/1984 |
| JP | 59-150692 | 8/1984 |
| JP | 60-133996 | 7/1985 |
| JP | 6031897 B1 | 7/1985 |
| JP | 61-283489 | 12/1986 |
| JP | 63-026205 | 2/1988 |
| JP | 63-42357 | 2/1988 |
| JP | 63-65056 | 3/1988 |
| JP | 63-089643 | 4/1988 |
| JP | 63-213628 | 9/1988 |
| JP | 01-177330 | 7/1989 |
| JP | 01-215941 | 8/1989 |
| JP | 03-60895 | 3/1991 |
| JP | 03-87327 | 4/1991 |
| JP | 03-133593 | 6/1991 |
| JP | 03-248799 | 11/1991 |
| JP | 04-237592 | 8/1992 |
| JP | 04-246142 | 9/1992 |
| JP | 04-358046 | 12/1992 |
| JP | 05-171340 | 7/1993 |
| JP | 06-346188 | 12/1994 |
| JP | 07-179997 | 7/1995 |
| JP | 07-268524 | 10/1995 |
| JP | 08-134570 | 5/1996 |
| JP | 08-174272 | 7/1996 |
| JP | 09-95755 | 4/1997 |
| JP | 09-108887 | 4/1997 |
| JP | 2001-066130 | 3/2001 |
| JP | 2001-303233 | 10/2001 |
| JP | 2002-060907 | 2/2002 |
| JP | 2002-241919 | 8/2002 |
| JP | 2003-205352 | 7/2003 |
| JP | 2004-086892 | 3/2004 |
| JP | 2004-149924 | 5/2004 |
| JP | 2005-042152 | 2/2005 |
| JP | 2005-290406 | 10/2005 |
| JP | 2007-154284 | 6/2007 |
| JP | 2008-246523 | 10/2008 |
| JP | 2008-261329 | 10/2008 |
| JP | 2009-154183 | 7/2009 |
| JP | 2010-138440 | 6/2010 |
| JP | 2010-138491 | 6/2010 |
| JP | 2012-000616 | 1/2012 |
| JP | 2012-055899 | 3/2012 |
| JP | 2014-047388 | 3/2014 |
| JP | 2015-016497 | 1/2015 |
| JP | 2015-083715 | 4/2015 |
| JP | 2015-526596 | 9/2015 |
| JP | 2018-131667 | 8/2018 |
| KR | 2002 0019296 | 3/2002 |
| KR | 10-0935816 B1 | 1/2010 |
| SU | 1706398 | 1/1992 |
| TW | 200806801 A | 2/2008 |
| WO | WO 84/000385 | 2/1984 |
| WO | WO 84/004760 | 12/1984 |
| WO | WO 95/004628 | 2/1995 |
| WO | WO 03/018856 | 3/2003 |
| WO | WO 06/080978 | 8/2006 |
| WO | WO 06/086350 | 8/2006 |
| WO | WO 07/120194 | 10/2007 |
| WO | WO 08/042330 | 4/2008 |
| WO | WO 08/060226 | 5/2008 |
| WO | WO 08/082353 | 7/2008 |
| WO | WO 08/105788 | 9/2008 |
| WO | WO 08/153499 | 12/2008 |
| WO | WO 09/085000 | 7/2009 |
| WO | WO 10/044740 | 4/2010 |
| WO | WO 10/046224 | 4/2010 |
| WO | WO 10/074634 | 7/2010 |
| WO | WO 10/134886 | 11/2010 |
| WO | WO 11/005403 | 1/2011 |
| WO | WO 11/021751 | 2/2011 |
| WO | WO 11/071054 | 6/2011 |
| WO | WO 11/084213 | 7/2011 |
| WO | WO 11/091479 | 8/2011 |
| WO | WO 11/152774 | 12/2011 |
| WO | WO 11/158706 | 12/2011 |
| WO | WO 12/021090 | 2/2012 |
| WO | WO 12/021186 | 2/2012 |
| WO | WO 12/022874 | 2/2012 |
| WO | WO 12/069329 | 5/2012 |
| WO | WO 12/112844 | 8/2012 |
| WO | WO 12/162226 | 11/2012 |
| WO | WO 13/049056 | 4/2013 |
| WO | WO 13/055652 | 4/2013 |
| WO | WO 13/060839 | 5/2013 |
| WO | WO 13/102650 | 7/2013 |
| WO | WO 13/126134 | 8/2013 |
| WO | WO 13/152306 | 10/2013 |
| WO | WO 13/167580 | 11/2013 |
| WO | WO 13/167628 | 11/2013 |
| WO | WO 13/185174 | 12/2013 |
| WO | WO 14/001544 | 1/2014 |
| WO | WO 14/023646 | 2/2014 |
| WO | WO 14/070006 | 5/2014 |
| WO | WO 14/081491 | 5/2014 |
| WO | WO 14/083544 | 6/2014 |
| WO | WO 14/085319 | 6/2014 |
| WO | WO 14/090922 | 6/2014 |
| WO | WO 14/114714 | 7/2014 |
| WO | WO 14/114715 | 7/2014 |
| WO | WO 14/187867 | 11/2014 |
| WO | WO 14/197088 | 12/2014 |
| WO | WO 14/201239 | 12/2014 |
| WO | WO 14/202488 | 12/2014 |
| WO | WO 15/028358 | 3/2015 |
| WO | WO 15/049309 | 4/2015 |
| WO | WO 15/075122 | 5/2015 |
| WO | WO 15/183955 | 12/2015 |
| WO | WO 16/003520 | 1/2016 |
| WO | WO 16/010599 | 1/2016 |
| WO | WO 16/041977 | 3/2016 |
| WO | WO 16/099390 | 6/2016 |
| WO | WO 16/124532 | 8/2016 |
| WO | WO 16/131702 | 8/2016 |
| WO | WO 17/046517 | 3/2017 |
| WO | WO 17/059026 | 4/2017 |
| WO | WO 17/063923 | 4/2017 |
| WO | WO 17/091743 | 6/2017 |
| WO | WO 17/132286 | 8/2017 |
| WO | WO 17/132322 | 8/2017 |
| WO | WO 17/134039 | 8/2017 |
| WO | WO 17/157835 | 9/2017 |
| WO | WO 17/186468 | 11/2017 |
| WO | WO 17/200797 | 11/2017 |
| WO | WO 18/015547 | 1/2018 |
| WO | WO 18/021409 | 2/2018 |
| WO | WO 18/050474 | 3/2018 |
| WO | WO 18/065614 | 4/2018 |
| WO | WO 18/04179 | 6/2018 |
| WO | WO 18/114845 | 6/2018 |
| WO | WO 18/138247 | 8/2018 |
| WO | WO 18/138270 | 8/2018 |

(56) References Cited

FOREIGN PATENT DOCUMENTS

| WO | WO 18/232618 | 12/2018 |
|---|---|---|
| WO | WO 19/021015 | 1/2019 |
| WO | WO 19/043219 | 3/2019 |
| WO | WO 19/047587 | 3/2019 |
| WO | WO 19/108596 | 6/2019 |
| WO | WO 19/145196 | 8/2019 |
| WO | WO 19/166749 | 9/2019 |
| WO | WO 19/197376 | 10/2019 |
| WO | WO 19/215450 | 11/2019 |
| WO | WO 20/007652 | 1/2020 |
| WO | WO 20/043718 | 3/2020 |
| WO | WO 20/053518 | 3/2020 |
| WO | WO 20/065296 | 4/2020 |
| WO | WO 20/065297 | 4/2020 |
| WO | WO 20/074241 | 4/2020 |
| WO | WO 20/115478 | 6/2020 |
| WO | WO 20/201437 | 10/2020 |
| WO | WO 20/201438 | 10/2020 |
| WO | WO 21/089851 | 5/2021 |
| WO | WO 21/217512 | 11/2021 |
| WO | WO 21/219564 | 11/2021 |
| WO | WO 21/231285 | 11/2021 |
| WO | WO 21/247981 | 12/2021 |
| WO | WO 22/149539 | 7/2022 |
| WO | WO 22/223835 | 10/2022 |
| WO | WO 23/091193 | 5/2023 |
| WO | WO 23/157438 | 8/2023 |

OTHER PUBLICATIONS

Audouard, et al., Mar. 26-31, 2000, Corrosion Performance and Field Experience With Super Duplex and Super Austenitic Stainless Steels in FGD Systems, CORROSION 2000, 8 pp.
Azo Materials, "Stainless Steel—Grade 420," Oct. 23, 2001, <https://www.azom.com/article.aspx?ArticleID=972>, accessed Aug. 15, 2017.
Branagan, et al.: Developing extreme hardness (>15GPa) in iron based nanocomposites, Composites Part A: Applied Science and Manufacturing, Elsevier Science Publishers B.V., Amsterdam, NL, vol. 33, No. 6, Jun. 1, 2002, pp. 855-859.
Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.
Cheney, et al.: "Development of quaternary Fe-based bulk metallic glasses," Materials Science and Engineering, vol. 492, No. 1-2, Sep. 25, 2008, pp. 230-235.
Cheney: Modeling the Glass Forming Ability of Metals. A Dissertation submitted in partial satisfaction of the Requirements for the degree of Doctor of Philosophy. University of California, San Diego. Dec. 2007.
C—Mo Phase Diagram [online], [retrieved on Jan. 27, 2015]. Retrieved from the Internet: <URL:http://factsage.cn/fact/documentation/SGTE/C-Mo.jpg.
C—Nb Phase Diagram [online], [retrieved on Jan. 27, 2015]. Retrieved from the Internet: <URL:http://www.crct.polymtl.ca/fact/documentation/BINARY/C-Nb.jpg.
Conversion Chart of Vickers Hardness (HV) to Rockwell C (HCR).
Cr—C Phase Diagram [online], [retrieved on Jan. 27, 2015]. Retrieved from the Internet: http://www.azom.com/work/3ud2quvLOU9g4VBMjVEh_files/image002.gif.
Crucible Industries LLC, Jun. 3, 2010, Crucible CPM S90V® data sheet, retrieved from the internet Mar. 14, 2019, https://www.crucible.com/PDFs/DataSheets2010/dsS90v1%202010.pdf, 2 pp.
Davis, Jr, ed. Dec. 1994, Stainless steels. ASM International, Materials Park, OH, p. 447.
Fujiki et al., 1988, The sintering phenomena and heat-treated properties of carbides and borides precipitated p/m alloys made of H.S.S. powder, Japan Society of Powder and Powder Metallurgy, 35(3):119-123.

Gorni, Oct. 9, 2003, Austenite transformation temperatures: ferrite start and finish, in Steel Forming and Heath Treating Handbook, pp. 26-43.
Iron-Carbon (Fe—C) Phase diagram [online], [retrieved on Jan. 27, 2014]. Retrieved from the internet: <URL:http://www.calphad.com/iron-carbon.html>.
Khalifa, et al.: "Effect of Mo—Fe substitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.
Kumashiro et al., May 31, 1980, The vickers micro-hardness of nonstoichiometric niobium carbide and vanadium carbide single crystals up to 1500c, Journal of Materials Science, 15(5):1321-1324.
Kushner et al., 1992, Thermal Spray Coatings, in Blau (ed) ASM Handbook, vol. 18, Friction, Lubrication, and Wear Technology, pp. 829-833.
Li et al., Feb. 28, 2000, Temperature dependence of the hardness of single-phase cementite films prepared by an electron-shower PVD method, Journal of the Japan Institute of Metals and Materials, 64(2):134-140.
Liu et al., Jan. 14, 2000, Measurement of austenite-to-ferrite transformation temperature after multi-pass deformation of steels, Materials Science and Engineering A, 194(1):L15-L18.
Miracle, D.B.: The efficient cluster packing model—An atomic structural model for metallic glasses, Acta Materialia vol. 54, Issue 16, Sep. 2006, pp. 4317-4336.
Miyoshi et al., Apr. 25, 1965, High temperature hardness of WC, TiC, TaC, NbC and their mixed carbides, Journal of the Japan Society of Powder and Powder Metallurgy, 12(2):78-84.
Ohmura, Dec. 2003, Evaluation of temper softening behavior of Fe—C binary martensitic steels by nanoindentation, Scripta Materialia, 49(12):1157-1162.
Senkov et al., Jun. 23, 2010, Refractory high-entropy alloys, Intermetallics, 18:1758-1765.
Teng: "Processing, Microstructures, and Properties of Aluminide-Strengthened Ferritic Steels," The University of Tennessee, Knoxville, Dec. 2011.
Tillack, et al.: "Selection of Nickel, Nickel-Copper, Nickel-Chromium, and Nickel-Chromium-Iron Allows", ASM Handbook, Welding, Brazing and Soldering, vol. 6,Dec. 1, 1993 (Dec. 1, 1993) pp. 586-592, XP008097120, p. 589.
Titanium-Boron (TiB) Phase Diagram [online], [retrieved on Jan. 27, 2015]. Retrieved from the internet: <URL:http://www.calphad.com/titaniumboron.html>.
Tucker , 2013, Introduction to Thermal Spray Technology, ASM Handbook, vol. 5A, pp. 3-9.
Wang et al., Jul. 2014, Effect of molybdenum, manganese and tungsten contents on the corrosion behavior and hardness of iron-based metallic glasses, Materials and Corrosion, 65(7):733-741.
Wank et al., 2007, Behavior of thermally sprayed wear protective coatings exposed to different abrasive wear conditions in comparison to hard chromium platings, 7 pp.
Wikipedia, Refractory metals, https://en/wikipedia.org/wiki/Refractory_metals.
Yamamoto et al., 2014, Influence of Mo and W on high temperature hardness of M7C3 carbide in high chromium white cast iron, Materials Transactions, 55(4):684-689.
Yano et al., Apr. 2011, Modification of NiAl intermetallic coatings processed by PTA with chromium carbides, ASTM International Journal, 8(4):190-204.
Yoo et al., Jun. 2006, The effect of boron on the wear behavior of iron-based hardfacing alloys for nuclear power plants valves, Journal of Nuclear Materials, 352:90-96.
Zhu et al., 2017, Microstructure and sliding wear performance of Cr7C3—(Ni, Cr)3(Al,Cr) coating deposited from Cr7C3 in situ formed atomized powder, J. Therm Spray Tech, 26:254-264.
International Search Report and Written Opinion re PCT Application No. PCT/US2019/024541, mailed Jul. 26, 2019.
Berns et al., 1987, Microstructure of Fe—Cr—C hardfacing alloys with additions of Nb, Ti and, B, Metallography, 20(4):401-429.

(56) References Cited

OTHER PUBLICATIONS

Kutsova, Nov. 9, 2015, The influence of alloying elements on structure formation, phase composition and properties of chromium-manganese iron in the cast state, Metallurgical and Mining Industry, 1084.

Lemkey et al., 1981, The quaternary system Fe—Cr—Mn—C and aligned ferrous superalloys, MRS Online Proceedings Library, 12:31.

Wayne, 1985, Iron-rich low-coast superalloys, PhD dissertation, University of Connecticut, 184 pp.

REDUCED CARBIDES FERROUS ALLOYS

CROSS-REFERENCE TO RELATED APPLICATIONS

This application is a continuation application of U.S. patent application Ser. No. 17/042,021, filed Sep. 25, 2020 and entitled "REDUCED CARBIDES FERROUS ALLOYS," which is a national-phase application of PCT Application No. PCT/US2019/024541, filed Mar. 28, 2019 and entitled "REDUCED CARBIDES FERROUS ALLOYS," which claims the benefit of U.S. Provisional Application No. 62/649,767, filed Mar. 29, 2018 and entitled "CARBIDE-FREE FERROUS ALLOYS." The content of each of the above applications is incorporated by reference herein in its entirety.

BACKGROUND

Field

The disclosure relates generally to wear resistant ferrous alloys having reduced carbide content.

Description of the Related Art

Abrasive and erosive wear is a major concern across many industries including mining, oil and gas drilling, mineral processing, concrete and asphalt production, and other applications that involve abrasive media wearing a surface. Applications where wear is an issue typically use wear resistant materials to extend the life of critical components. Wear resistant metal coatings, known as "hardfacing", bulk cast, or wrought wear resistant alloys are common solutions to these wear problems. Wear resistant alloys typically comprise various borides, carbides, and/or high hardness matrix phases to achieve a desired level of wear resistance while balancing other critical performance metrics such as toughness and cost.

Hardfacing is one example of a manufacturing method which can be used to produce wear resistant parts. However, there is frequently a degree of imprecision in these processes when converting from the feedstock form (e.g., powder, wire, etc.) to the final coating, especially when working with new materials. The imprecision can lead to significant divergence from the desired chemistry, microstructure, thermodynamics, and performance of the resulting material as compared to the original powder, especially with complex alloys. However, while precision is increased with conventional alloys with simple chemistries, they often fail to meet modern performance requirements.

Useful wear resisting or hardbanding alloys can comprise borides, which can increase wear resistance. Boride comprising wear resistant alloys generally fall into two categories: 1) alloys that comprise a single boride phase; and 2) alloys that comprise one or more boride phases with additional carbides.

U.S. Pat. No. 6,171,222, hereby incorporated by reference in its entirety, teaches a wear resistant alloy system that comprises chromium borides in a ferrous matrix. While this system can achieve a wear resistant alloy, it is limited by the maximum hardness achievable by borides that comprise iron and chromium.

U.S. Pat. and Pub. No.'s 2014/0234154, 2015/0354036, U.S. Pat. No. 7,935,198, 2016/0168670, and 2016/0024624, the entirety of each of which is hereby incorporated by reference in its entirety, teach alloys that comprise a combination of hard boride and hard carbide phases that contribute to the wear resistance of the alloys.

SUMMARY

The present disclosure includes, but is not limited to, the following embodiments.

Embodiment 1: A feedstock material configured to form a microstructure comprising Fe, B: about 1 wt. % to about 3.6 wt. %, C: about 0 wt. % to about 0.5 wt. %, Cr: about 2 wt. % to about 15 wt. %, Mo: about 4 wt. % to about 15 wt. %, Ni: about 0 wt. % to about 3 wt. %, Mn: about 0 wt. % to about 3 wt. %, and Si: about 0 wt. % to about 2 wt. %, wherein the feedstock material configured to form the microstructure comprising a martensitic matrix characterized by having, under thermodynamic equilibrium conditions a mole fraction of complex borides comprising ≥30 wt. % Mo+W, wherein the mole fraction of the complex borides is between about 5 and about 50%, a mole fraction of chromium borides comprising ≥50 wt. % Fe+Cr, wherein the mole fraction of the chromium borides is between about 5 and about 50%, and a mole fraction of hardphases other than the complex borides and the chromium borides of less than about 10%.

Embodiment 2: The feedstock material of Embodiment 1, wherein C: about 0.05 wt. % to about 0.5 wt. %.

Embodiment 3: The feedstock material of Embodiments 1 or 2, wherein the mole fraction of complex borides is between 12.5 and 30.

Embodiment 4: The feedstock material of Embodiments 1-3, wherein the mole fraction of chromium borides is between 12.5 and 30.

Embodiment 5: The feedstock material of Embodiments 1-4, wherein the feedstock material is configured to form the microstructure comprising a mole fraction of hypereutectic hard phases of less than about 10%.

Embodiment 6: The feedstock material of Embodiment 5, wherein the mole fraction of hypereutectic hard phases is less than about 1%.

Embodiment 7: The feedstock material of Embodiments 1-6, wherein the feedstock material is configured to form the microstructure comprising a mole fraction of all hard phases of between about 5% and about 50%.

Embodiment 8: The feedstock material of Embodiment 7, wherein the mole fraction of all hard phases is between about 20% and about 50%.

Embodiment 9: The feedstock material of Embodiment 8, wherein the mole fraction of all hard phases is between about 35% and about 45%.

Embodiment 10: The feedstock material of Embodiments 1-9, wherein the feedstock material is configured to form the microstructure comprising a mole fraction of primary carbides of less than about 1%.

Embodiment 11: The feedstock material of Embodiments 1-10, wherein the mole fraction of hardphases other than the complex borides and the chromium borides is less than about 1%.

Embodiment 12: The feedstock material of Embodiments 1-11, wherein the feedstock material is configured to form microstructure having a martensitic matrix which comprises Fe and is selected from the group consisting of, in wt. %, B: 2.6, C: 0.2, Cr: 10, Mo: 7, B: 2.6, Cr: 8, Mo: 7, B: 2.6, Cr: 8, Mo: 10, B: 2.6, Cr: 6, Mo: 10, B: 2.6, Cr: 4, Mo: 10, B: 2.6, Cr: 2, Mo: 10, B: 3.4, Cr: 5, Mo: 14, B: 2.8, C: 0.2, Cr: 8, Mo: 7, Mn: 1, Si: 0.5, B: 3, C: 0.2, Cr: 6, Mo: 9, Mn: 1, Si: 0.5, B: 3, C: 0.2, Cr: 8, Mo: 7, B: 3, C: 0.2, Cr: 8.7, Mo: 8.3, B: 3.4, C: 0.25, Cr: 9.7, Mo: 9.4, B: 2.8, C: 0.5, Cr: 8, Mo: 7, Mn: 1, Si: 0.5, B: 3, C: 0.5, Cr: 6, Mo: 9, Mn: 1, Si: 0.5, B: 3, C: 0.5, Cr: 8, Mo: 7, B: 3, C: 0.5, Cr: 8.7, Mo: 8.3, B: 3.2, C: 0.5, Cr: 8.7, Mo: 8.3, and B: 3.4, C: 0.5, Cr: 9.7, Mo: 9.4.

Embodiment 13: The feedstock material of any one of Embodiments 1-12, wherein the feedstock material is configured to form the microstructure having a composition of B: about 3, C: about 0.2, Cr: about 8.7, and Mo: about 8.3, or B: about 3.4, C: about 0.25, Cr: about 9.7, and Mo: about 9.4.

Embodiment 14: The feedstock material of any one of Embodiments 1-13, wherein the feedstock material is a powder.

Embodiment 15: The feedstock material of any one of Embodiments 1-14, wherein a composition of the thermal feedstock comprises: B: about 7.5 to about 8.8 wt %, C: about 0.1 to about 1.0 wt %, Cr: about 18 to about 26 wt %, and Mo: about 17 to about 25 wt %

Embodiment 16: A coating formed from the feedstock material of any one of Embodiments 1-15, the coating having a martensitic matrix.

Embodiment 17: The coating of Embodiment 16, wherein the coating has a hardness of at least 59 HRC.

Embodiment 18: The coating of Embodiment 17, wherein the coating has a hardness of at least 65 HRC.

Embodiment 19: The coating of any one of Embodiments 16-18, wherein the coating comprises a volume fraction of complex borides comprising ≥30 wt. % Mo+W, wherein the volume fraction of the complex borides is between about 5 and about 50%, a volume fraction of chromium borides comprising ≥50 wt. % Fe+Cr, wherein the volume fraction of the chromium borides is between about 5 and about 50%, and a volume fraction of hardphases other than the complex borides and the chromium borides of less than about 10%.

Embodiment 20: The coating of Embodiment 19, wherein the volume fraction of complex borides is between 12.5 and 30.

Embodiment 21: The coating of any one of Embodiments 16-20, further comprising a volume fraction of hypereutectic hard phases of less than about 10%.

Embodiment 22: The coating of Embodiment 21, wherein the volume fraction of hypereutectic hard phases is less than about 1%.

Embodiment 23: The coating of any one of Embodiments 16-23, wherein a volume fraction of all hard phases is between about 20% and about 50%.

Embodiment 24: The coating of any one of Embodiments 19-23, wherein the volume fraction of hardphases other than the complex borides and the chromium borides is less than about 1%.

Embodiment 25: The coating of any one of Embodiments 16-24, further comprising a weight percent of carbon in the martensitic matrix of between about 0 and about 0.45 wt. %.

Embodiment 26: The coating of Embodiment 25, wherein the weight percent of carbon in the martensitic matrix is between about 0.2 and about 0.37 wt. %

Embodiment 27: The coating of any one of Embodiments 16-26, further comprising a percent of chromium in the martensitic matrix of between 5 and 12 wt. %.

Embodiment 28: A method of forming a hardfacing coating onto a substrate, the method comprising applying a feedstock material to the substrate to form the coating, the coating comprising Fe, B: about 1 wt. % to about 3.6 wt. %, C: about 0 wt. % to about 0.5 wt. %, Cr: about 2 wt. % to about 15 wt. %, Mo: about 4 wt. % to about 15 wt. %, Ni: about 0 wt. % to about 3 wt. %, Mn: about 0 wt. % to about 3 wt. %, and Si: about 0 wt. % to about 2 wt. %, wherein the feedstock material is configured to form a martensitic matrix which is characterized by having, under thermodynamic equilibrium conditions a mole fraction of complex borides comprising ≥30 wt. % Mo+W, wherein the mole fraction of the complex borides is between about 5 and about 50%, a mole fraction of chromium borides comprising ≥50 wt. % Fe+Cr, wherein the mole fraction of the chromium borides is between about 5 and about 50%, and a mole fraction of hardphases other than the complex borides and the chromium borides of less than about 10%.

Embodiment 29: The method of Embodiment 28, wherein C: about 0.05 wt. % to about 0.5 wt. %.

Embodiment 30: The method of any one of Embodiments 28-29, wherein the applying is a thermal spray.

Embodiment 31: The method of any one of Embodiments 28-29, wherein the applying is a bulk welding process.

Embodiment 32: The method of any one of Embodiments 28-31, wherein the substrate is a wear plate.

Embodiment 33: A wear-resistant dual-boride metallic coating comprising Fe, B: about 1 wt. % to about 3.6 wt. %, C: about 0 wt. % to about 0.5 wt. %, Cr: about 2 wt. % to about 15 wt. %, Mo: about 4 wt. % to about 15 wt. %, Ni: about 0 wt. % to about 3 wt. %, Mn: about 0 wt. % to about 3 wt. %, Si: about 0 wt. % to about 2 wt. %, a martensitic matrix, a volume fraction of complex borides comprising ≥30 wt. % Mo+W, wherein the mole fraction of the complex borides is between about 5 and about 50%, a volume fraction of chromium borides comprising ≥50 wt. % Fe+Cr, wherein the mole fraction of the chromium borides is between about 5 and about 50%, and a volume fraction of hardphases other than the complex borides and the chromium borides of less than about 10%.

Embodiment 34: The coating of Embodiment 33, wherein C: about 0.05 wt. % to about 0.5 wt. %.

Embodiment 35: The coating of Embodiments 33-34, wherein the volume fraction of complex borides is between 12.5 and 30.

Embodiment 36: The coating of any one of Embodiments 33-35, wherein the volume fraction of chromium borides is between 12.5 and 30.

Embodiment 37: The coating of any one of Embodiments 33-36, further comprising a volume fraction of hypereutectic hard phases is less than about 10%.

Embodiment 38: The coating of Embodiment 37, wherein the volume fraction of hypereutectic hard phases is less than about 1%.

Embodiment 39: The coating of any one of Embodiments 33-38, further comprising a volume fraction of all hard phases of between about 5% and about 50%.

Embodiment 40: The coating of Embodiment 39, wherein the volume fraction of all hard phases is between about 20% and about 50%.

Embodiment 41: The coating of Embodiment 39, wherein the volume fraction of all hard phases is between about 35% and about 45%.

Embodiment 42: The coating of any one of Embodiments 33-41, further comprising a volume fraction of primary carbides of less than about 1%.

Embodiment 43: The coating of any one of Embodiments 33-42, further comprising a weight percent of carbon in the martensitic matrix of between about 0 and about 0.45 wt. %.

Embodiment 44: The coating of Embodiment 43, wherein the weight percent of carbon in the martensitic matrix is between about 0.2 and about 0.37 wt. %.

Embodiment 45: The coating of any one of Embodiments 33-44, wherein the volume fraction of hardphases other than the complex borides and the chromium borides is less than about 1%.

Embodiment 46: The coating of any one of Embodiments 33-45, further comprising a percent of chromium in the martensitic matrix of between 5 and 12 wt. %.

Embodiment 47: The coating of any one of Embodiments 33-46, wherein the coating comprises Fe and is selected from the group consisting of, in wt. %, B: 2.6, C: 0.2, Cr: 10, Mo: 7, B: 2.6, Cr: 8, Mo: 7, B: 2.6, Cr: 8, Mo: 10, B: 2.6, Cr: 6, Mo: 10, B: 2.6, Cr: 4, Mo: 10, B: 2.6, Cr: 2, Mo: 10, B: 3.4, Cr: 5, Mo: 14, B: 2.8, C: 0.2, Cr: 8, Mo: 7, Mn: 1, Si: 0.5, B: 3, C: 0.2, Cr: 6, Mo: 9, Mn: 1, Si: 0.5, B: 3, C: 0.2, Cr: 8, Mo: 7, B: 3, C: 0.2, Cr: 8.7, Mo: 8.3, B: 3.4, C: 0.25, Cr: 9.7, Mo: 9.4, B: 2.8, C: 0.5, Cr: 8, Mo: 7, Mn: 1, Si: 0.5, B: 3, C: 0.5, Cr: 6, Mo: 9, Mn: 1, Si: 0.5, B: 3, C: 0.5, Cr: 8, Mo: 7, B: 3, C: 0.5, Cr: 8.7, Mo: 8.3, B: 3.2, C: 0.5, Cr: 8.7, Mo: 8.3, and B: 3.4, C: 0.5, Cr: 9.7, Mo: 9.4.

Embodiment 48: The coating of any one of Embodiments 33-46, wherein a composition of the coating is B: about 3, C: about 0.2, Cr: about 8.7, Mo: about 8.3, or B: about 3.4, C: about 0.25, Cr: about 9.7, and Mo: about 9.4.

Embodiment 49: The coating of any one of Embodiments 33-48, wherein the coating has a hardness of at least 60 HRC.

Embodiment 50: The coating of Embodiment 49, wherein the coating has a hardness of at least 65 HRC.

Embodiment 51: The coating of any one of Embodiments 33-50, wherein the coating is a hardfacing overlay.

Embodiment 52: A powder configured to form the coating of any one of Embodiments 33-51.

Embodiment 53: The powder of Embodiment 52, wherein a composition of the powder is B: about 7.5 to about 8.8 wt %, C: about 0.1 to about 1.0 wt %, Cr: about 18 to about 26 wt %, Mo: about 17 to about 25 wt %

Disclosed herein are embodiments of a ferrous alloy that comprises under equilibrium or near equilibrium solidification conditions at 1300K a mole fraction of borides comprising ≥30 wt. % Mo+W between about 5 and about 50%, a mole fraction of borides comprising ≥50 wt. % Fe+Cr between about 5 and about 50%, and a mole fraction of hardphases with ≥1000 HV other than borides comprising ≥30 wt. % Mo+W and borides comprising ≥50 wt. % Fe+Cr of less than about 10%.

In some embodiments, a mole fraction of hypereutectic hard phases can be less than about 10%. In some embodiments, a mole fraction of all hard phases can be between about 5 and about 50%. In some embodiments, a mole fraction of primary carbides can be less than about 1%. In some embodiments, the matrix can comprise between about 1 and about 25 wt. % chromium. In some embodiments, a weight percent of carbon in the matrix can be between about 0 and about 0.45 wt. %.

In some embodiments, a composition of the alloy can comprise Fe and, in wt. %: B: about 1 to about 3.6; C: about 0 to about 0.5; Cr: about 2 to about 15; Mo: about 4 to about 15; Ni: about 0 to about 3; Mn: about 0 to about 3; and Si: about 0 to about 2.

In some embodiments, the alloy can be a powder. In some embodiments, the alloy can be a melt. In some embodiments, the alloy can be a cored wire having an outer sheath and a powder core. In some embodiments, the alloy can be scrap. In some embodiments the alloy may be an overlay or hardfacing.

Also disclosed herein are embodiments of a dual boride phase ferrous alloy configured to form a wear resistant material having a matrix, the matrix of the wear resistant material comprising Fe and: a volume fraction of borides comprising ≥30 wt. % Mo+W between about 5 and about 50%, a volume fraction of borides comprising ≥50 wt. % Fe+Cr between about 5 and about 50%, and a volume fraction of hardphases with ≥1000 HV other than borides comprising ≥30 wt. % Mo+W and borides comprising ≥50 wt. % Fe+Cr of less than about 10%.

In some embodiments, a volume fraction of hypereutectic borides can be less than about 10%. In some embodiments, a volume fraction of total hard phases can be between about 5 and about 50%. In some embodiments, a volume fraction of carbides can be less than about 1%. In some embodiments, the matrix can comprise between about 1 and about 25 wt. % chromium.

In some embodiments, a composition of the wear resistant material can comprise, in wt. %: B: about 1 to about 3.6; C: about 0 to about 0.5; Cr: about 2 to about 15; Mo: about 4 to about 15; Ni: about 0 to about 3; Mn: about 0 to about 3; and Si: about 0 to about 2.

Further disclosed herein are embodiments of a ferrous alloy comprising Fe and, in wt. %: B: about 1.5 to about 3.6; C: about 0.1 to about 0.5; Cr: about 2 to about 15; and Mo: about 4 to about 12, wherein the ferrous alloy is configured to form a wear resistant material having a dual-phase boride structure.

In some embodiments, the alloy can further comprise, in wt. %: Ni: about 0 to about 3; Mn: about 0 to about 3; and Si: about 0 to about 2.

In some embodiments, the alloy can comprise Fe and, in wt. %: B: 2.6, C: 0.2, Cr: 10, Mo: 7; B: 2.6, Cr: 8, Mo: 7; B: 2.6, Cr: 8, Mo: 10; B: 2.6, Cr: 6, Mo: 10; B: 2.6, Cr: 4, Mo: 10; B: 2.6, Cr: 2, Mo: 10; B: 3.4, Cr: 5, Mo: 14; B: 2.8, C: 0.2, Cr: 8, Mo: 7, Mn: 1, Si: 0.5; B: 3, C: 0.2, Cr: 6, Mo: 9, Mn: 1, Si: 0.5; or B: 3, C: 0.2, Cr: 8, Mo: 7; B: 3, C: 0.2, Cr: 8.7, Mo: 8.3; B: 3.4, C: 0.25, Cr: 9.7, Mo: 9.4.

DETAILED DESCRIPTION

Figure 1:
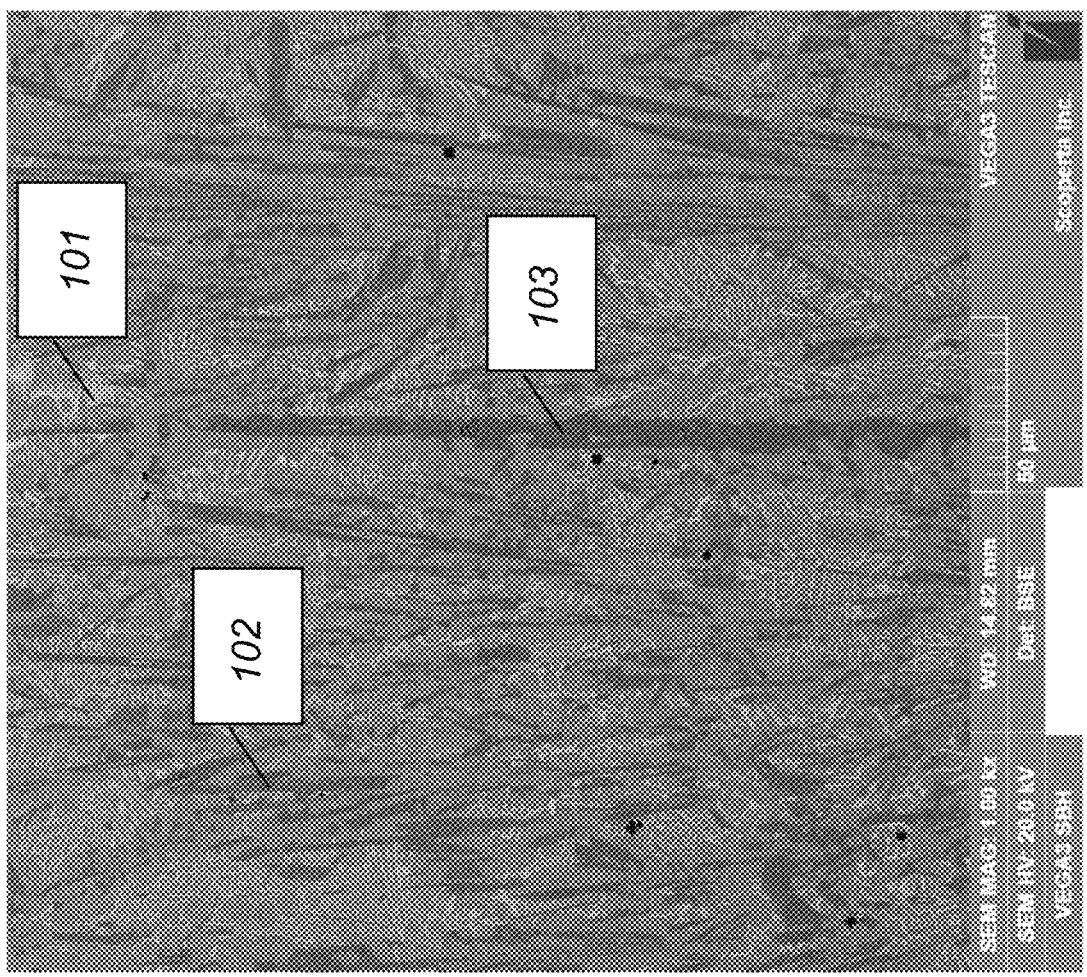
FIG. 1 shows a micrograph of an embodiment of a disclosed alloy (X8).

In this disclosure, embodiments of ferrous alloys are described that can include two or more boride phases in addition to a matrix phase without forming carbides from the liquid. Specifically, embodiments of the alloys can comprise iron chromium borides and $M_2B$ and/or $M_3B_2$ type borides where a substantial portion of M is Mo or W. In some embodiments, a substantial portion is ≥30 wt. % Mo+W (or ≥about 30 wt. % Mo+W).

This can confer several advantages over conventional hardfacing and wear resistant alloy systems. Advantages may include, but are not limited to: 1) not having to balance carbon and a carbide forming element to achieve the desired level of carbon in the ferrous matrix phase; 2) reducing expensive alloying additions such boron carbide, niobium, vanadium, and/or titanium; 3) more wear resistance compared to alloys only comprising iron and/or chromium borides; 4) higher impact performance compared to alloys of similar wear resistance; 5) higher fluidity and weldability due to lower refractory alloy content; and 6) lack of high temperature phases that limit powder manufacture.

In some embodiments, alloys of this disclosure specifically avoid the formation of carbides in the microstructure allowing for easier manufacturability while avoiding the use of expensive carbide formers such as Ti, Nb, Zr, Hf, V. In some embodiments, this disclosure teaches alloys that can have additional boride phases with higher hardness and thus greater wear resistance for a given boride fraction compared to U.S. Pat. No. 6,171,222.

The term alloy can refer to the chemical composition of a powder used to form a metal component (e.g., coating, layer, etc.), the powder itself, the chemical composition of a melt used to form a casting component, the melt itself, and the composition of the metal component formed by the heating, sintering, and/or deposition of the powder, including the composition of the metal component after cooling (such as a coating). In some embodiments, the term alloy can refer to the chemical composition forming the powder disclosed within, the powder itself, the feedstock itself, the wire, the wire including a powder, the combined composition of a combination of wires, the composition of the metal component formed by the heating and/or deposition of the powder, or other methodology, and the metal component.

In some embodiments, alloys manufactured into a solid or cored wire (a sheath containing a powder) for welding or for use as a feedstock for another process may be described by specific chemistries herein. For example, the wires can be used for a thermal spray. Further, the compositions disclosed below can be from a single wire or a combination of multiple wires (such as 2, 3, 4, or 5 wires).

In some embodiments, the alloys can be applied by a thermal spray process to form a thermal spray coating, such as HVOF alloys. In some embodiments, the alloys can be applied as a weld overlay. In some embodiments, the alloys can be applied either as a thermal spray or as a weld overlay, e.g., having dual use.

In some embodiments, wires can be used to form the metal component. For example, pure element powders, ferro alloy powders, and a metallic sheath can be used to achieve a bulk compositions. In some embodiments, casting can be used. Casting can utilize a range of feedstock material, potentially including powders. For example, casting feedstock can include scrap steel, iron, ferro alloys in the form of large pieces, and other pieces of pure elements, thought the particular feedstock is not limiting.

Metal Alloy Composition

In some embodiments, the alloy can be described by specific compositions, in weight %, and including Fe. In some embodiments, Fe can make the balance of the alloy. In some embodiments, the disclosed compositions may be the feedstock. In some embodiments, the disclosed compositions may be the deposit formed from the feedstock.

In some embodiments, the composition of the alloy can include Fe and, in wt. %:
B: 1 to 3 (or about 1 to about 3)
C: 0 to 0.75 (or about 0 to about 0.75)
Cr: 2 to 15 (or about 2 to about 15)
Mo: 4 to 15 (or about 4 to about 15)
Ni: 0 to 3 (or about 0 to about 3)
Mn: 0 to 3 (or about 0 to about 3)
Si: 0 to 2 (or about 0 to about 2)

In some embodiments, the composition of the alloy can include Fe and, in wt. %:
B: 1 to 3 (or about 1 to about 3)
C: 0.05 to 0.75 (or about 0 to about 0.75)
Cr: 2 to 15 (or about 2 to about 15)
Mo: 4 to 15 (or about 4 to about 15)
Ni: 0 to 3 (or about 0 to about 3)
Mn: 0 to 3 (or about 0 to about 3)
Si: 0 to 2 (or about 0 to about 2)

In some embodiments, the composition of the alloy can include Fe and, in wt. %:
B: 1 to 3 (or about 1 to about 3)
C: 0 to 0.5 (or about 0 to about 0.5)
Cr: 2 to 15 (or about 2 to about 15)
Mo: 4 to 15 (or about 4 to about 15)
Ni: 0 to 3 (or about 0 to about 3)
Mn: 0 to 3 (or about 0 to about 3)
Si: 0 to 2 (or about 0 to about 2)

In some embodiments, the composition of the alloy can include Fe and, in wt. %:
B: 1 to 3 (or about 1 to about 3)
C: 0.05 to 0.5 (or about 0 to about 0.5)
Cr: 2 to 15 (or about 2 to about 15)
Mo: 4 to 15 (or about 4 to about 15)
Ni: 0 to 3 (or about 0 to about 3)
Mn: 0 to 3 (or about 0 to about 3)
Si: 0 to 2 (or about 0 to about 2)

In some embodiments, the composition of the alloy can include Fe and, in wt. %:
B: 1 to 3.6 (or about 1 to about 3.6)
C: 0 to 0.5 (or about 0 to about 0.5)
Cr: 2 to 15 (or about 2 to about 15)
Mo: 4 to 15 (or about 4 to about 15)
Ni: 0 to 3 (or about 0 to about 3)
Mn: 0 to 3 (or about 0 to about 3)
Si: 0 to 2 (or about 0 to about 2)

In some embodiments, the composition of the alloy can include Fe and, in wt. %:
B: 1 to 3.6 (or about 1 to about 3.6)
C: 0.05 to 0.5 (or about 0 to about 0.5)
Cr: 2 to 15 (or about 2 to about 15)
Mo: 4 to 15 (or about 4 to about 15)
Ni: 0 to 3 (or about 0 to about 3)
Mn: 0 to 3 (or about 0 to about 3)
Si: 0 to 2 (or about 0 to about 2)

In some embodiments, the composition of the alloy can include Fe and, in wt. %:
B: 1 to 3 (or about 1 to 3)
C: 0 to 0.5 (or about 0 to 0.5)
Cr: 2 to 15 (or about 2 to 15)
Mo: 4 to 12 (or about 4 to 12)

In some embodiments, the composition of the alloy can include Fe and, in wt. %:
B: 1 to 3 (or about 1 to 3)
C: 0.05 to 0.5 (or about 0 to 0.5)
Cr: 2 to 15 (or about 2 to 15)
Mo: 4 to 12 (or about 4 to 12)

In some embodiments, the composition of the alloy can include Fe and, in wt. %:
B: 1 to 3.6 (or about 1 to about 3.6)
C: 0 to 0.5 (or about 0 to 0.5)
Cr: 2 to 15 (or about 2 to 15)
Mo: 4 to 12 (or about 4 to 12)

In some embodiments, the composition of the alloy can include Fe and, in wt. %:
B: 1 to 3.6 (or about 1 to 3.6)
C: 0.05 to 0.5 (or about 0 to 0.5)
Cr: 2 to 15 (or about 2 to 15)
Mo: 4 to 12 (or about 4 to 12)

In some embodiments, the composition of the alloy can also include, in wt. %:
Ni: 0 to 3 (or about 0 to 3)
Mn: 0 to 3 (or about 0 to 3)
Si: 0 to 2 (or about 0 to 2)

In some embodiments, the composition of the alloy can include Fe and, in wt. %:
B: 2 to 3.6 (or about 2 to about 3.6)
C: 0.1 to 0.4 (or about 0.1 to about 0.4)
Cr: 5.5 to 12 (or about 5.5 to about 12)
Mo: 6 to 11 (or about 6 to about 11)

In some embodiments, the composition of the alloy can include Fe and, in wt. %:
B: 2.5 to 3.5 (or about 2.5 to about 3.5)
C: 0.15 to 0.35 (or about 0.15 to about 0.35)
Cr: 6 to 10 (or about 6 to about 10)
Mo: 6 to 10 (or about 6 to about 10)

In some embodiments, the composition of the alloy can include Fe and, in wt. %:
B: 2.6 to 3.4 (or about 2.6 to about 3.4)
C: 0 to 0.5 (or about 0 to about 0.5)
Cr: 5 to 11 (or about 5 to about 11)
Mo: 5 to 11 (or about 5 to about 11)

In some embodiments, the composition of the alloy can include Fe and, in wt. %:
B: 2.6 to 3.4 (or about 2.6 to about 3.4)
C: 0.05 to 0.5 (or about 0 to about 0.5)
Cr: 5 to 11 (or about 5 to about 11)
Mo: 5 to 11 (or about 5 to about 11)

In some embodiments, the composition of the alloy can include Fe and, in wt. %:
B: 7.5 to 8.8 (or about 7.5 to about 8.8)
C: 0.1 to 1.0 (or about 0.1 to about 1.0)
Cr: 18 to 26 (or about 18 to about 26)
Mo: 17 to 25 (or about 17 to about 25)

In some embodiments, the composition of the alloy can include Fe and, in wt. %:
B: 2.6, C: 0.2, Cr: 10, Mo: 7 (or B: about 2.6, C: about 0.2, Cr: about 10, Mo: about 7)
B: 2.6, Cr: 8, Mo: 7 (or B: about 2.6, Cr: about 8, Mo: about 7)
B: 2.6, Cr: 8, Mo: 10 (or B: about 2.6, Cr: about 8, Mo: about 10)
B: 2.6, Cr: 6, Mo: 10 (or B: about 2.6, Cr: about 6, Mo: about 10)
B: 2.6, Cr: 4, Mo: 10 (or B: about 2.6, Cr: about 4, Mo: about 10)
B: 2.6, Cr: 2, Mo: 10 (or B: about 2.6, Cr: about 2, Mo: about 10)
B: 3.4, Cr: 5, Mo: 14 (or B: about 3.4, Cr: about 5, Mo: about 14)
B: 2.8, C: 0.2, Cr: 8, Mo: 7, Mn: 1, Si: 0.5 (or B: about 2.8, C: about 0.2, Cr: about 8, Mo: about 7, Mn: about 1, Si: about 0.5)
B: 3, C: 0.2, Cr: 6, Mo: 9, Mn: 1, Si: 0.5 (or B: about 3, C: about 0.2, Cr: about 6, Mo: about 9, Mn: about 1, Si: about 0.5)
B: 3, C: 0.2, Cr: 8, Mo: 7 (or B: about 3, C: about 0.2, Cr: about 8, Mo: about 7)
B: 3, C: 0.2, Cr: 8.7, Mo: 8.3 (or B: about 3, C: about 0.2, Cr: about 8.7, Mo: about 8.3)
B: 3.2, C: 0.2, Cr: 8.7, Mo: 8.3 (or B: about 3.2, C: about 0.2, Cr: about 8.7, Mo: about 8.3)
B: 3.4, C: 0.25, Cr: 9.7, Mo: 9.4 (or B: about 3.4, C: about 0.25, Cr: about 9.7, Mo: about 9.4)
B: 2.8, C: 0.5, Cr: 8, Mo: 7, Mn: 1, Si: 0.5 (or B: about 2.8, C: about 0.5, Cr: about 8, Mo: about 7, Mn: about 1, Si: about 0.5)
B: 3, C: 0.5, Cr: 6, Mo: 9, Mn: 1, Si: 0.5 (or B: about 3, C: about 0.5, Cr: about 6, Mo: about 9, Mn: about 1, Si: about 0.5)
B: 3, C: 0.5, Cr: 8, Mo: 7 (or B: about 3, C: about 0.5, Cr: about 8, Mo: about 7)
B: 3, C: 0.5, Cr: 8.7, Mo: 8.3 (or B: about 3, C: about 0.5, Cr: about 8.7, Mo: about 8.3)
B: 3.2, C: 0.5, Cr: 8.7, Mo: 8.3 (or B: about 3.2, C: about 0.5, Cr: about 8.7, Mo: about 8.3)
B: 3.4, C: 0.5, Cr: 9.7, Mo: 9.4 (or B: about 3.4, C: about 0.5, Cr: about 9.7, Mo: about 9.4)

In any of the above compositional ranges where C is identified as 0 to X, C may be included within the composition and thus the above formulas can also be recited as $0 > C \geq X$.

Alloys presented in Table 1 have been identified and experimentally manufactured successfully as lab scale ingots. Chemistries in this table represent nominal or target chemistries for a given ingot alloy, and can have the following accuracy ranges: C±0.2; B±0.2; Cr±1; Mo±1; Mn, Ni, and Si±0.5 wt %. These ingots can meet the specific thermodynamic and microstructural embodiments described in this disclosure. Included are Rockwell hardness values measured in HRC, whereas the elements are recited in weight %.

TABLE 1

Alloys meeting the specific thermodynamic and microstructural criteria of this disclosure made into ingots

| | B | C | Cr | Mn | Mo | Ni | Si | HRC |
|---|---|---|---|---|---|---|---|---|
| P59-X7 | 2.6 | 0.2 | 10 | | 7 | | | 64 |
| P59-X8 | 2.6 | 0 | 8 | | 7 | | | 70 |
| P59-X9 | 2.6 | 0 | 8 | | 10 | | | 68 |
| P59-X10 | 2.6 | 0 | 6 | | 10 | | | 55 |
| P59-X11 | 2.6 | 0 | 4 | | 10 | | | 57 |
| P59-X12 | 2.6 | 0 | 2 | | 10 | | | 55 |
| P59-X13 | 3.4 | 0 | 5 | | 14 | | | 59 |
| P59-X18 | 2.8 | 0.2 | 8 | 1 | 7 | | 0.5 | |
| P59-X19 | 3 | 0.2 | 6 | 1 | 9 | | 0.5 | |
| X21 | 3 | 0.3 | 8.3 | | 7.5 | | | |
| X28 | 3.4 | 0.3 | 11 | | 5 | | | |

Table 2 shows chemistries of a cored wire, such as for use in arc welding, which can form deposits that can meet the specific thermodynamic and microstructural embodiments described in this disclosure. Included are Rockwell hardness values measured in HRC, whereas the elements are recited in weight %. The X18 wire can nominally result in the X18 ingot. Through normal dilution with a steel substrate inherent in various welding processes, the other wires can create compositions that meet the microstructural and thermodynamic embodiments in the rest of the disclosure. The composition can be determined by factoring in the dilution with a mild steel, low alloy steel, or high alloy steel substrate. Different wires below (e.g., X18/X18A/X18B) can produce welds with various amounts of borides and different matrix chemistries that may result in changes in performance. The composition can have the following accuracy ranges: C±0.2; B±0.2; Cr±1; Mo±1; Mn, Ni, and Si±0.5 wt %.

TABLE 2

Feedstock wires where the wire and/or welding deposit meets the specific thermodynamic and microstructural criteria of this disclosure.

|  | B | C | Cr | Mn | Mo | Ni | Si | HRC |
|---|---|---|---|---|---|---|---|---|
| P59-X18 Wire | 4.7 | 0.35 | 13 | 1 | 11.6 |  | 0.5 | 65 |
| P59-X18A Wire | 5.4 | 0.4 | 12.5 | 1 | 13.4 |  | 0.5 | 67 |
| P59-X18B Wire | 5.3 | 0.5 | 12.5 | 1 | 13.4 |  | 0.5 | 66 |

The hardness listed in Table 2 shows the hardness of the weld deposit formed from the wire.

Table 3 shows chemistries of a powder, such as for use in bulk welding, which can form deposits that can meet the specific thermodynamic and microstructural embodiments described in this disclosure. Included are Rockwell hardness values measured in HRC, whereas the elements are recited in weight %. The hardness is measured from a bulk weld deposit of the powder. The powders listed below may form alloys that meet the thermodynamic and microstructural criteria in the rest of this disclosure. The composition can have the following accuracy ranges: C±0.2; B±0.2; Cr±1; Mo±1; Mn, Ni, and Si±0.5 wt %.

TABLE 3

Bulk chemistry of a blended powder used to manufacture alloys using a bulk welding process that meet the specific thermodynamic and microstructural criteria of this disclosure.

|  | B | C | Cr | Mn | Mo | Ni | Si | HRC | Powder to Wire Ratio |
|---|---|---|---|---|---|---|---|---|---|
| P59-X18 Bulk Powder | 8.3 | 0.19 | 23.4 | .4 | 21.77 |  | 0.17 | 61 | 1.3:1 |
| P59-X18A Bulk Power | 8.3 | 0.19 | 23.4 | .4 | 21.77 |  | 0.17 | 64 | 1.5:1 |
| P59-X18B Bulk Power | 8.3 | 0.19 | 23.4 | .4 | 21.77 |  | 0.17 | 65 | 1.7:1 |
| P59-X18C Bulk Power | 8.3 | 0.19 | 23.4 | .4 | 21.77 |  | 0.17 | 65 | 2:1 |

Table 3 shows chemistries of a powder, such as for use different welding techniques, which can form deposits that can meet the specific thermodynamic and microstructural embodiments described in this disclosure. Included are Rockwell hardness values measured in HRC, whereas the elements are recited in weight %. The composition can have the following accuracy ranges: C±0.2; B±0.2; Cr±1; Mo±1; Mn, Ni, and Si±0.5 wt %.

TABLE 4

Atomized powder chemistries where the powder and deposit produced from said powder using PTA, laser, or other welding process meets the specific thermodynamic and microstructural criteria of this disclosure.

|  | B | C | Cr | Mn | Mo | Ni | Si | HRC |
|---|---|---|---|---|---|---|---|---|
| P59-X18A Atomized Powder | 3.0 | 0.2 | 8.5 | 1.0 | 7.5 |  | 0.5 | 66 |

In some embodiments, the alloys can have a hardness greater to or equal to 55 HRC (or about 55 HRC). In some embodiments, the alloys can have a hardness greater to or equal to 60 HRC (or about 60 HRC). In some embodiments, the alloys can have a hardness greater to or equal to 65 HRC (or about 65 HRC). In some embodiments, the alloys can have a hardness greater to or equal to 70 HRC (or about 70 HRC). In some embodiments, the alloys can have a hardness less to or equal to 70 HRC (or about 70 HRC). In some embodiments, the alloys can have a hardness less to or equal to 65 HRC (or about 65 HRC).

The disclosed alloys can incorporate the above elemental constituents to a total of 100 wt. %. In some embodiments, the alloy may include, may be limited to, or may consist essentially of the above named elements. In some embodiments, the alloy may include 2% or less of impurities. Impurities may be understood as elements or compositions that may be included in the alloys due to inclusion in the feedstock components, through introduction in the manufacturing process.

Further, the Fe content identified in all of the compositions described in the above paragraphs may be the balance of the composition as indicated above, or alternatively, the balance of the composition may comprise Fe and other elements. In some embodiments, the balance may consist essentially of Fe and may include incidental impurities. In some embodiments, the compositions can have at least 60 wt. % Fe (or at least about 60 wt. % Fe). In some embodiments, the composition can have between 60 and 80 wt. % Fe (or between about 60 and about 80 wt. % Fe).

Microstructural Criteria

In some embodiments, alloys of this disclosure may be fully described by microstructural criteria. Alloys can meet some or all of the described microstructural criteria. In some embodiments, a dual-phase boride structure may be formed, which has two types of borides.

The first three microstructural criteria of a dual phase boride structure are: 1) Mo+W complex borides; 2) Fe+Cr borides; and 3) a ferrous matrix with no additional hard phases.

The first microstructural criteria is the volume fraction of borides comprising a given wt. % Mo+W. In some embodiments Mo+W can be ≥30 wt. % (or ≥about 30 wt. %). In some embodiments Mo+W can be ≥35 wt. % (or ≥about 35 wt. %). In some embodiments Mo+W can be ≥40 wt. % (or ≥about 40 wt. %). In some embodiments Mo+W can be ≥45 wt. % (or ≥about 45 wt. %). In some embodiments Mo+W can be ≥50 wt. % (or ≥about 50 wt. %). In some embodiments Mo+W can be ≥55 wt. % (or ≥about 55 wt. %). In some embodiments Mo+W can be ≥60 wt. % (or ≥about 60 wt. %). Mo and W can be interchangeable, and in some embodiments either Mo or W may be 0. These will be known as "complex borides". This phase typically has the chemical formula $M_2B$ or $M_3B_2$, where M is a mixture of one or more metallic elements including substantial portions of Mo and/or W. These borides can convey several advantages over typical borides used in wear resistant alloys, including those with a metallic constituent that comprises predominantly iron and/or chromium. For example, complex borides can form a finer grained lamellar eutectic structure, which can lead to increased toughness and wear performance. Complex borides can be extremely hard, often over 2000 HV, which can thereby increase wear resistance for a given hard phase or boride fraction in an alloy. Additionally, the complex boride phases may also be spheroidized or partially spheroidized much more readily than iron and chromium borides. This modification can further increase toughness over conventional alloys allowing for more applications or components using less material.

The complex boride volume fraction can be measured using XRD, EBSD, and/or quantitative metallography techniques. In FIG. 1, showing a micrograph of Alloy X8, a complex boride phase is [101]. XRD and/or EBSD can be used to verify the structure of the boride as $M_2B$ or $M_3B_2$ type. Chemistry of the phase is identified using EDX or similar spectroscopy techniques in a SEM.

The following description is applicable for any of the Mo+W ranges discussed above. In some embodiments, the complex boride volume fraction of the alloy can be between 5 and 50% (or between about 5 and about 50%). In some embodiments, the complex boride volume fraction of the alloy can be between 5 and 35% (or between about 5 and about 35%). In some embodiments, the complex boride volume fraction of the alloy can be between 5 and 30% (or between about 5 and about 30%). In some embodiments, the complex boride volume fraction of the alloy can be between 5 and 20% (or between about 5 to about 20%). In some embodiments, the complex boride volume fraction of the alloy can be between 5 and 15% (or between about 5 to about 15%). In some embodiments, the complex boride volume fraction of the alloy can be between 10 and 15% (or between about 10 to about 15%). In some embodiments, the complex boride volume fraction of the alloy can be between 7.5 and 15% (or between about 7.5 to about 15%). In some embodiments, the complex boride volume fraction of the alloy can be between 10 and 20% (or between about 10 to about 20%). In some embodiments, the complex boride volume fraction of the alloy can be between 10 and 15% (or between about 10 to about 15%). In some embodiments, the complex boride volume fraction of the alloy can be between 10 and 25% (or between about 10 to about 25%). In some embodiments, the complex boride volume fraction of the alloy can be between 12.5 and 30% (or between about 12.5 to about 30%).

The second microstructural criteria is the volume fraction of borides comprising Fe+Cr. In some embodiments Fe+Cr can be ≥40 wt. % (or ≥about 40 wt. %). In some embodiments Fe+Cr can be ≥50 wt. % (or ≥about 50 wt. %). In some embodiments Fe+Cr can be ≥60 wt. % (or ≥about 60 wt. %). In some embodiments Fe+Cr can be ≥70 wt. % (or ≥about 70 wt. %). In some embodiments Fe+Cr can be ≥75 wt. % (or ≥about 75 wt. %). In some embodiments Fe+Cr can be ≥80 wt. % (or ≥about 80 wt. %). In some embodiments, Fe or Cr could be 0. In some embodiments, this criteria could also meet <30% Mo+W (or <about 30% Mo+W). These will be known as "chromium borides". This phase typically has the chemical formula $Cr_2B$ or $M_2B$, with M being Fe+Cr. These borides convey several advantages. Chromium borides are readily formed by low cost elements (Cr and Fe) reducing cost of the alloy. Also, chromium and iron are less refractory than W, Mo, Ti, Nb, Hf, Zr, and Ta used to form other hard phases such as borides or carbides. This can improve mixing, weldability, lowers melting temperature, and minimizes the use of less available alloying additions The chromium boride volume fraction is measured using XRD, EBSD, and/or quantitative metallography techniques. In FIG. 1, this is the phase labeled [102]. XRD and/or EBSD can be used to verify the structure of the boride as $M_2B$ or $Cr_2B$ type. Chemistry of the phase is identified using EDX or similar spectroscopy techniques in a SEM.

The following description is applicable to any of the Fe+Cr ranges discussed above. In some embodiments, the chromium boride volume fraction of the alloy can be between 5 and 50% (or between about 5 and about 50%). In some embodiments, the chromium boride volume fraction of the alloy can be between 5 and 35% (or between about 5 and about 35%). In some embodiments, the chromium boride volume fraction of the alloy can be between 5 and 30% (or between about 5 and about 30%). In some embodiments, the chromium boride volume fraction of the alloy can be between 5 and 20% (or between about 5 and about 20%). In some embodiments, the chromium boride volume fraction of the alloy can be between 5 and 15% (or between about 5 and about 15%). In some embodiments, the chromium boride volume fraction of the alloy can be between 10 and 20% (or between about 10 to about 20%). In some embodiments, the chromium boride volume fraction of the alloy can be between 15 and 25% (or between about 15 to about 25%). In some embodiments, the chromium boride volume fraction of the alloy can be between 20 and 30% (or between about 20 to about 30%). In some embodiments, the chromium boride volume fraction of the alloy can be between 10 and 15% (or between about 10 to about 15%). In some embodiments, the chromium boride volume fraction of the alloy can be between 10 and 25% (or between about 10 to about 25%). In some embodiments, the chromium boride volume fraction of the alloy can be between 12.5 and 30% (or between about 12.5 to about 30%).

The third microstructural criteria is the volume fraction of other hardphases in the alloy where hardphases are defined as phases with ≥1000 HV (or ≥about 1000 HV). These phases may include carbides, borocarbides, intermetallics, and other boride phases not specifically identified in the first two criteria that form from the solid during solidification. Hard phases that precipitate from the solid are specifically excluded from this criteria, such as pearlite, bainite, proeutectoid cementite, and others. Borocarbide phases can be problematic as they typically form an interconnected eutectic structure, minimizing areas of tough matrix critical to impeding crack formation. This can lead to a less impact resistant alloy for a given level of hard phases. Further, embrittling borocarbides can be softer than boride phases leading to reduced wear performance for a given level of alloying with boron. Typically these phases have the formula $M_{23}(C,B)_6$ where M can be substantially iron and/or chromium.

The volume fraction of other hardphases is measured as the sum of all phases that are not $M_2B$, $M_3B_2$, $Cr_2B$, and iron based matrix phases such as austenite, ferrite, and martensite. $M_2B$, $M_3B_2$, $Cr_2B$ may not be stoichiometric so normal variation is allowed for. Hardphases may also be defined as having a hardness of greater than 1000 HV (or greater than about 1000 HV). For example, there may be vacancies in the crystal structure of these phases so the exact chemistry may be something like $M_{1.9}B_{1.1}$. Also included in the other hardphase criteria are $M_2B$, $M_3B_2$, $Cr_2B$ phases where the chemistry does not meet the specific requirements of the first two criteria. This volume fraction is measured using one or more of XRD, EBSD, EDS, and quantitate metallographic techniques. In FIG. 1, the volume fraction of other hardphases is 0%.

In some embodiments, the total volume fraction of other hardphases can be less than 10% (or less than about 10%). In some embodiments, the total volume fraction of other hardphases can be less than 5% (or less than about 5%). In some embodiments, the total volume fraction of other hardphases can be less than 2.5% (or less than about 2.5%). In some embodiments, the total volume fraction of other hardphases can be less than 1% (or less than about 1%). In some embodiments, the total volume fraction of other hardphases can be 0% (or about 0%).

In some embodiments, the total volume fraction of carbides can be less than 10% (or less than about 10%). In some embodiments, the total volume fraction of carbides can be less than 5% (or less than about 5%). In some embodiments, the total volume fraction of carbides can be less than 2.5% (or less than about 2.5%). In some embodiments, the total volume fraction of carbides can be less than 1% (or less than about 1%). In some embodiments, the total volume fraction of carbides can be 0% (or about 0%).

The fourth microstructural criteria is the volume fraction of hypereutectic borides. Hypereutectic complex borides form as blocky near spherical phases with a near 1:1 aspect ratio. Hypereutectic chromium borides can form as long rod shaped phases, typically >100 μm and have a high aspect ratio. These phases can contribute disproportionately to lowering the toughness and impact resistance of the alloy for a given level of wear resistance. Thus it can be advantageous to minimize the volume fraction of these phases.

The volume fraction of hypereutectic borides is measured using quantitative microscopy by one skilled in the art, and is labeled [103] in FIG. 1.

In some embodiments, the hypereutectic boride volume fraction of the alloy can be ≤20% (or ≤about 20%). In some embodiments, the hypereutectic boride volume fraction of the alloy can be ≤15% (or ≤about 15%). In some embodiments, the hypereutectic boride volume fraction of the alloy can be ≤10% (or ≤about 10%). In some embodiments, the hypereutectic boride volume fraction of the alloy can be ≤7.5% (or ≤about 7.5%). In some embodiments, the hypereutectic boride volume fraction of the alloy can be 5% (or ≤about 5%). In some embodiments, the hypereutectic boride volume fraction of the alloy can be ≤2.5% (or ≤about 2.5%). In some embodiments, the hypereutectic boride volume fraction of the alloy can be ≤1% (or ≤about 1%). In some embodiments, the hypereutectic boride volume fraction of the alloy can be 0% (or about 0%).

The fifth microstructural criterion is the volume fraction of carbides that form from the liquid (e.g., primary carbides). In some embodiments, this is the also the volume of all carbides in the final matrix. Eliminating or minimizing the volume fraction of this phase can allow precise control over the microstructural and performance properties of the resulting material. Carbides can confer several disadvantages depending on their specific composition and microstructural morphology. Iron and chromium carbides, such as $M_7C_3$, are only ~1600 HV in hardness. Also, they seldom form at equilibrium leaving excess carbon and or chrome remaining in the matrix of the alloy leading to retained austenite or requiring long heat treatment cycles to reach equilibrium. This can lead to reduced wear performance or high processing costs. In the case of the MC carbides, they often form at very high temperatures resulting in reduced fluidity during welding, casting, or other processes. This can pose significant costs to quality of end products using these alloys. Alloys in this disclosure minimize or eliminate the formation of carbides to avoid these issues.

The carbide volume fraction of carbides measured using XRD, EBSD, and/or quantitative metallography techniques. Not included in this definition are carbides precipitated from the solid including those found in pearlitic or bainitic structures, proeutectoid cementite, or other secondary carbides formed from the solid during a heat treatment cycle or during solidification. This non-included carbides may be beneficial to form a bainitic or pearlitic matrix structure.

FIG. 1 shows an alloy with no carbides that form from the liquid.

In some embodiments, the carbide volume fraction of the alloy can be ≤5% (or ≤about 5%). In some embodiments, the carbide volume fraction of the alloy can be ≤3% (or ≤about 3%). In some embodiments, the carbide volume fraction of the alloy can be ≤2% (or ≤about 2%). In some embodiments, the carbide volume fraction of the alloy can be ≤1% (or ≤about 1%). In some embodiments, the carbide volume fraction of the alloy can be ≤0.5% (or ≤about 0.5%). In some embodiments, the carbide volume fraction of the alloy can be ≤0.25% (or ≤about 0.25%). In some embodiments, the carbide volume fraction of the alloy can be ≤0.10% (or ≤about 0.10%). In some embodiments, the carbide volume fraction of the alloy can be 0% (or about 0%).

The sixth microstructural criteria is the total hardphase fraction of the alloy. This is defined as the sum of all borides, carbides, borocarbides, and nitrides. This criteria allows the prediction of the wear resistance of a given alloy as higher hardphase fraction generally leads to improved wear resistance. In FIG. 1, this would be the sum of the complex boride volume fraction [101] and the chromium boride volume fraction [102].

In some embodiments, the total hardphase fraction of the alloy can be between 15 and 55% (or between about 15 and about 55%). In some embodiments, the total hardphase fraction of the alloy can be between 25 and 45% (or between about 25 and about 45%). In some embodiments, the total hardphase fraction of the alloy can be between 35 and 55% (or between about 35 and about 55%). In some embodiments, the total hardphase fraction of the alloy can be between 35 and 45% (or between about 35 and about 45%).

The seventh microstructural criteria is the weight percent of chromium in the ferrous matrix. Chromium is an alloying constituent which can contribute to the corrosion resistance of an alloy in various environments. Having a chromium free or low chromium matrix may be detrimental to the performance of alloys described in this disclosure where corrosion is a significant factor, especially where erosion/corrosion and/or abrasion/corrosion synergies contribute significantly to premature failure of conventional materials. Conversely, excessive chromium can destabilize the austenitic phase during solidification promoting the formation of a ferritic matrix. Ferritic matrices may not be advantageous due to their lower hardness compared to predominantly martensitic and/or bainitic matrices.

In some embodiments, the weight percent of chromium in the matrix can be between 1 and 25 wt. % (or between about 1 and about 25 wt. %). In some embodiments, the weight percent of chromium in the matrix can be between 3 and 20 wt. % (or between about 3 and about 20 wt. %). In some embodiments, the weight percent of chromium in the matrix can be between 5 and 15 wt. % (or between about 5 and about 15 wt. %). In some embodiments, the weight percent of chromium in the matrix can be between 5 and 12 wt. % (or between about 5 and about 12 wt. %).

In some embodiments, the microstructure may be martensite, however the final microstructure may be ferrite, pearlite, austenite, bainite, etc., and the particular final microstructure is not limiting.

Thermodynamic Criteria

In some embodiments, alloys of this disclosure may be fully described by thermodynamic criteria. Alloys can meet some or all of the described thermodynamic criteria. The thermodynamic criteria can predict the near equilibrium microstructure formed during welding, casting, etc. The microstructure criteria can then drive the performance characteristics of the alloy in some embodiments.

The first three thermodynamic criteria of a dual phase boride structure are: 1) Mole fraction of Mo+W complex borides; 2) Mole fraction of Fe+Cr borides; and 3) a ferrous matrix with no additional hard phases. These thermodynamic characteristics can be strong predictors of the eventual microstructural features when deposited as a weld, cast, or other methods. The calculated and/or measured mole fraction of borides described in the first two criteria can lead to a very similar volume fraction in the resulting microstructure. Avoiding other hard phases as described in criteria three can result in a microstructure that comprises mostly borides of the first two criteria and a ferrous matrix.

Additional thermodynamic criteria can include: 4) hypereutectic boride mole fraction, 5) mole fraction of carbides that form from the liquid, 6) total hardphase mole fraction of the alloy, 7) wt. % chromium in the matrix, 8) percent carbon in the matrix, and 9) difference in formation temperature of two boride phases and liquidus.

Criteria 4 can be an indicator of the toughness of the alloy with higher hypereutectic boride fractions generally reducing toughness. Criteria 5 can predict the phase fraction of carbides that can have microstructural effects that reduce performance. Criteria 6 can be a predictor of wear performance with higher hardphase content generally leading to improved wear performance. Criteria 7 can predict corrosion resistance of the alloy which is important in applications where both abrasion/erosion and corrosion are present. Criteria 8, percent carbon in the ferrous matrix, can also be a predictor of non-advantageous phases during cooling and the eventual hardness of the bulk alloy. Excessive carbon, in the presence of free boron during cooling, can lead to the formation of embrittling borocarbides which significantly limit the toughness of the resulting alloy. Too little carbon on the other hand can impede the formation of sufficiently hard martensite or martensite at all both lowering bulk hardness of the alloy and its eventual wear performance. Criteria 9 can be a strong predictor of a fine microstructural morphology where an alloy that comprises two boride phases that form very close to the liquidus temperature from the liquid during solidification will have a finer structure than an alloy with the same phases present that has a larger difference between formation temperatures and liquidus.

Figure 2:
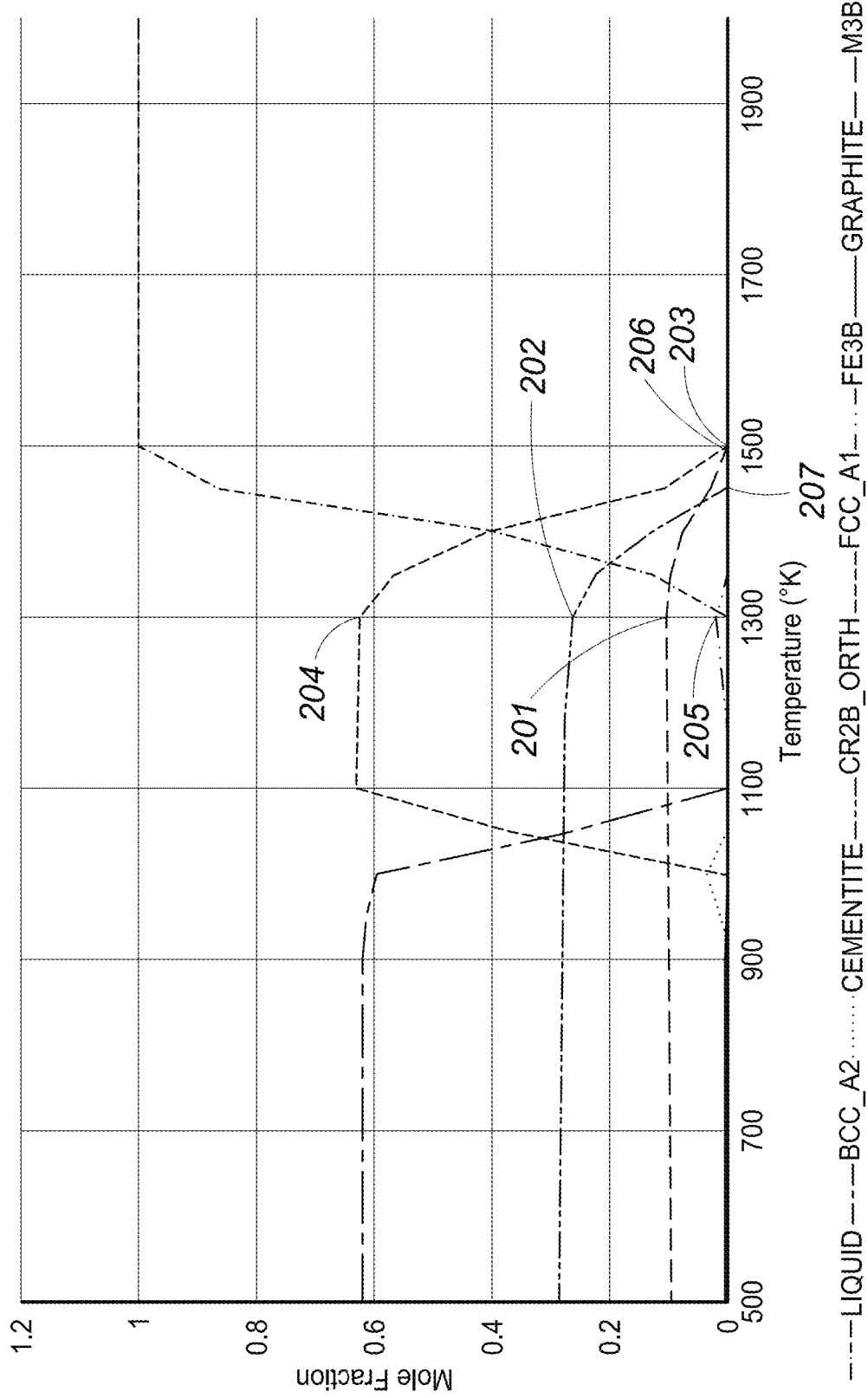
FIG. 2 shows an equilibrium solidification diagram of an embodiment of an alloy with the composition: B: 2.8, C: 0.2, Cr: 8, Mn: 1, Mo: 7, and Si: 0.5 (X18).

The first thermodynamic criteria is the mole fraction of borides comprising a given wt. % Mo+W. In some embodiments Mo+W can be ≥30 wt. % (or ≥about 30 wt. %). In some embodiments Mo+W can be ≥35 wt. % (or ≥about 35 wt. %). In some embodiments Mo+W can be ≥40 wt. % (or ≥about 40 wt. %). In some embodiments Mo+W can be ≥45 wt. % (or ≥about 45 wt. %). In some embodiments Mo+W can be ≥50 wt. % (or ≥about 50 wt. %). In some embodiments Mo+W can be ≥55 wt. % (or ≥about 55 wt. %). In some embodiments Mo+W can be ≥60 wt. % (or ≥about 60 wt. %). These will be known as "complex borides". This phase typically has the chemical formula $M_2B$ or $M_3B_2$ where M is a mixture of one or more metallic elements including ≥30 wt. % Mo and/or W. These borides can convey several advantages over typical borides used in wear resistant alloys including those with a metallic constituent that comprises predominantly iron and/or chromium. Complex borides form a finer grained lamellar eutectic structure leading to increased toughness and wear performance. Complex borides can be substantially harder, often over 2000 HV increasing wear resistance for a given hard phase or boride fraction in an alloy. In FIG. 2, $M_3B_2$ phase with the predicted chemistry is typically 2000-2200 HV.

The complex boride mole fraction is measured as the sum of all borides meeting the above chemical and structural classification at 1300K during solidification [201], as shown in the phase diagram of Alloy X18 in FIG. 2. In the case of the alloy described by FIG. 2, the chemistry of the $M_3B_2$ phase comprises 66.9 wt. % Mo+W and the mole fraction of complex boride is measured at 9.9%.

The following description is applicable for any of the Mo+W ranges discussed above. In some embodiments, the complex boride mole fraction of the alloy can be between 5 and 50% (or between about 5 and about 50%). In some embodiments, the complex boride mole fraction of the alloy can be between 5 and 35% (or between about 5 and about 35%). In some embodiments, the complex boride mole fraction of the alloy can be between 5 and 30% (or between about 5 and about 30%). In some embodiments, the complex boride mole fraction of the alloy can be between 5 and 20% (or between about 5 and about 20%). In some embodiments, the complex boride mole fraction of the alloy can be between 5 and 15% (or between about 5 and about 15%). In some embodiments, the complex boride mole fraction of the alloy can be between 10 and 15% (or between about 10 to about 15%). In some embodiments, the complex boride mole fraction of the alloy can be between 7.5 and 15% (or between about 7.5 to about 15%). In some embodiments, the complex boride mole fraction of the alloy can be between 10 and 20% (or between about 10 to about 20%). In some embodiments, the complex boride mole fraction of the alloy can be between 10 and 15% (or between about 10 to about 15%). In some embodiments, the complex boride mole fraction of the alloy can be between 10 and 25% (or between about 10 to about 25%). In some embodiments, the complex boride mole fraction of the alloy can be between 12.5 and 30% (or between about 12.5 to about 30%).

The second thermodynamic criteria is the mole fraction of borides comprising Fe+Cr. In some embodiments Fe+Cr can be ≥40 wt. % (or ≥about 40 wt. %). In some embodiments Fe+Cr can be ≥50 wt. % (or ≥about 50 wt. %). In some embodiments Fe+Cr can be ≥60 wt. % (or ≥about 60 wt. %). In some embodiments Fe+Cr can be ≥70 wt. % (or ≥about 70 wt. %). In some embodiments Fe+Cr can be ≥75 wt. % (or ≥about 75 wt. %). In some embodiments Fe+Cr can be ≥80 wt. % (or ≥about 80 wt. %). These will be known as "chromium borides". This phase typically has the chemical formula $Cr_2B$ or $M_2B$. These borides convey several advantages. Chromium borides are readily formed by low cost elements (Cr and Fe) reducing cost of the alloy. Also chromium and iron are less refractory than W, Mo, Ti, Nb, Hf, Zr, and Ta used to form other hard phases such as borides or carbides. This improves mixing, weldability, lowers melting temperature, and minimizes the use of less available alloying additions.

The chromium boride mole fraction is measured during equilibrium solidification conditions at 1300K [202] in FIG. 2. In the case of the alloy described in FIG. 2, the chromium boride chemistry comprises 87 wt. % Fe+Cr and the mole fraction is measured as 26% at 1300K.

The following description is applicable for any of the Fe+Cr ranges discussed above. In some embodiments, the chromium boride mole fraction of the alloy can be between 5 and 50% (or between about 5 and about 50%). In some embodiments, the chromium boride mole fraction of the alloy can be between 5 and 35% (or between about 5 and about 35%). In some embodiments, the chromium boride mole fraction of the alloy can be between 5 and 30% (or between about 5 and about 30%). In some embodiments, the chromium boride mole fraction of the alloy can be between 5% and 20% (or between about 5 and about 20%). In some embodiments, the chromium boride mole fraction of the alloy can be between 5% and 15% (or between about 5 and about 15%). In some embodiments, the chromium boride mole fraction of the alloy can be between 15 and 30% (or between about 15 and about 30%). In some embodiments, the chromium boride mole fraction of the alloy can be between 10 and 20% (or between about 10 to about 20%). In some embodiments, the chromium boride mole fraction of the alloy can be between 15 and 25% (or between about 15 to about 25%). In some embodiments, the chromium boride mole fraction of the alloy can be between 20 and 30% (or between about 20 to about 30%). In some embodiments, the chromium boride mole fraction of the alloy can be between 10 and 15% (or between about 10 to about 15%). In some embodiments, the chromium boride mole fraction of the alloy can be between 10 and 25% (or between about 10 to about 25%). In some embodiments, the chromium boride mole fraction of the alloy can be between 12.5 and 30% (or between about 12.5 to about 30%).

The third thermodynamic criteria is the mole fraction of other hardphases in the alloy where hardphases are defined as phases with ≥1000 HV. These phases may include carbides, borocarbides, intermetallics, and other boride phases not specifically identified in the first two criteria that form from the solid during solidification. Hard phases that precipitate from the solid are specifically excluded from this criteria. Borocarbide phases can form an interconnected eutectic structure minimizing areas of tough matrix to impede crack formation. This can lead to a less impact resistant alloy for a given level of hard phases. Further, embrittling borocarbides can be softer than desirable boride phases leading to reduced wear performance for a given level of alloying with boron. Typically these phases have the formula $M_{23}(C,B)_6$ where M is substantially iron and/or chromium. Additional hardphases may also include MC type carbides and $M_7C_3$ type carbides.

The mole fraction of other hardphases is measured as the sum of all phases, that form from the liquid, that are not $M_2B$, $M_3B_2$, $Cr_2B$, and iron based matrix phases such as austenite, ferrite, martensite. $M_2B$, $M_3B_2$, $Cr_2B$ may not be stoichiometric so normal variation is allowed for. Also included in the other hardphase criteria are $M_2B$, $M_3B_2$, $Cr_2B$ phases where the chemistry does not meet the specific requirements of the first two criteria. This mole fraction is measured at 1300K under equilibrium solidification conditions. In FIG. 2 the only other hardphase present that forms from the liquid is $Fe_3B$ resulting in a mole fraction of other hardphases of 1.9% [205].

In some embodiments, the total mole fraction of other hardphases can be less than 10% (or less than about 10%). In some embodiments, the total mole fraction of other hardphases can be less than 5% (or less than about 5%). In some embodiments, the total mole fraction of other hardphases can be less than 2.5% (or less than about 2.5%). In some embodiments, the total mole fraction of other hardphases can be less than 1% (or less than about 1%). In some embodiments, the total mole fraction of other hardphases can be 0% (or about 0%).

The fourth thermodynamic criteria is the mole fraction of hypereutectic borides. Hypereutectic complex borides form as blocky near spherical phases with a near 1:1 aspect ratio. Hypereutectic chromium borides form as long rod shaped phases, typically >100 μm and have a high aspect ratio. These phases can contribute disproportionately to lowering the toughness and impact resistance of the alloy for a given level of wear resistance. Thus it is often advantageous to minimize the volume fraction of these phases.

The mole fraction of hypereutectic borides is measured as the sum of all borides at the liquidus temperature during equilibrium solidification. In the case of FIG. 2, all borides form at or at a lower temperature than the liquidus [203] resulting in a hypereutectic boride fraction of 0%.

In some embodiments, the hypereutectic boride mole fraction of the alloy can be ≤10% (or ≤about 10%). In some embodiments, the hypereutectic boride mole fraction of the alloy can be ≤7.5% (or ≤about 7.5%). In some embodiments, the hypereutectic boride mole fraction of the alloy can be ≤5% (or ≤about 5%). In some embodiments, the hypereutectic boride mole fraction of the alloy can be ≤2.5% (or ≤about 2.5). In some embodiments, the hypereutectic boride mole fraction of the alloy can be ≤1% (or ≤about 1%). In some embodiments, the hypereutectic boride mole fraction of the alloy can be 0% (or about 0%).

The fifth thermodynamic criterion is the mole fraction of carbides that form from the liquid. Both eutectic and hypereutectic carbides meet this definition. Eliminating or minimizing the mole fraction of this phase allows precise control over the thermodynamic, microstructural, and performance properties of the resulting material. Carbides confer several disadvantages depending on their specific composition and microstructural morphology. Iron and chromium carbides such as the $M_7C_3$ type are only ~1600 HV in hardness. Also, they seldom form at equilibrium leaving excess carbon and or chrome remaining in the matrix of the alloy leading to retained austenite or requiring long and expensive heat treatment cycles to reach equilibrium. This can lead to reduced wear performance or high processing costs. In the case of the MC type carbides, they often form at very high temperatures resulting in reduced fluidity during welding, casting, or other processes. This can pose significant costs to quality of end products using these alloys. Alloys in this disclosure minimize or eliminate the formation of carbides to avoid these issues.

Figure 3:
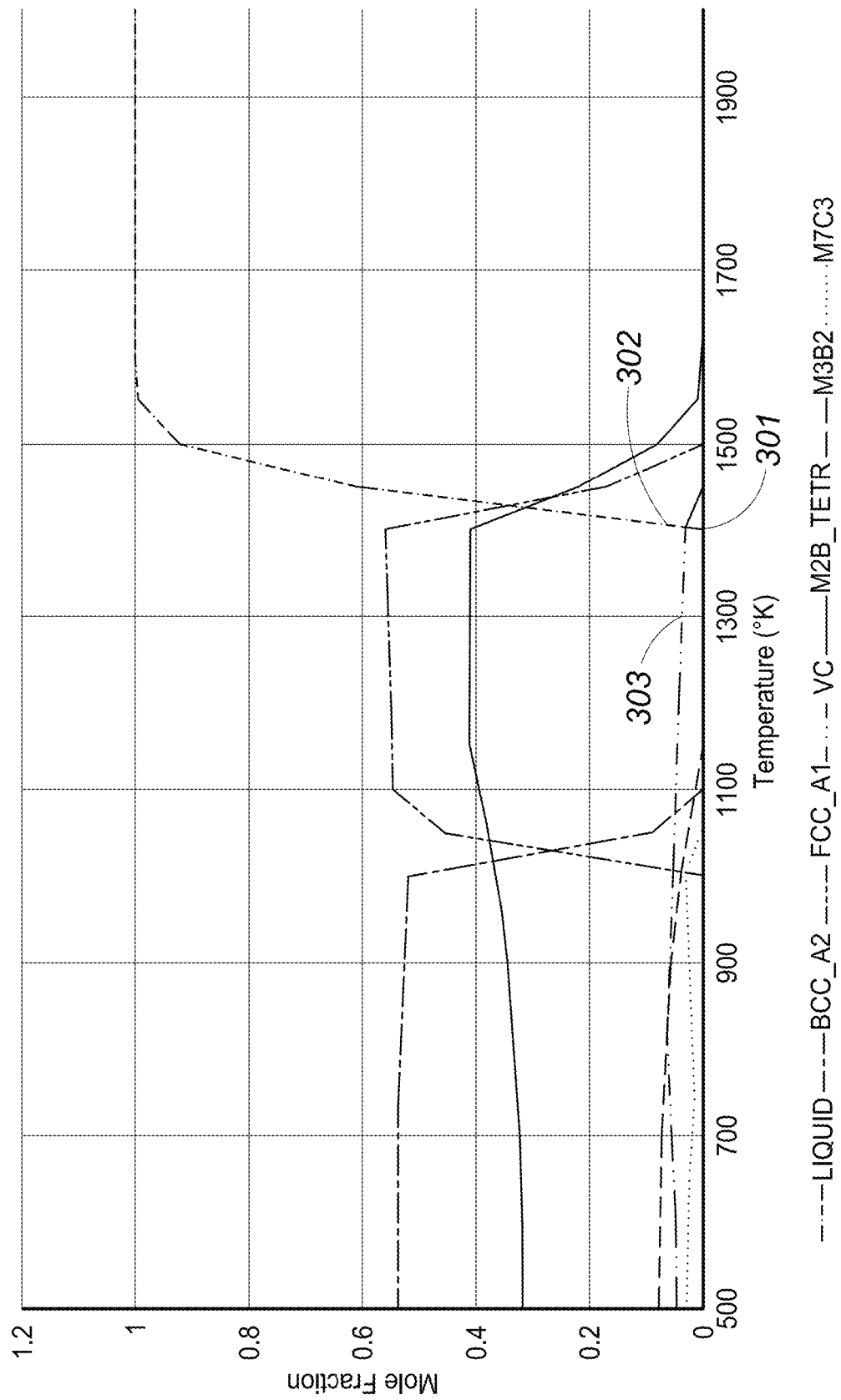
FIG. 3 shows an equilibrium solidification diagram of an alloy which does not meet all criteria disclosed herein with the composition: B: 3.0, C: 0.8, Cr: 8, Mo: 6, and V: 2.

The carbide mole fraction is measured as the sum of all carbides present at the solidus [301] during equilibrium solidification conditions. In the alloy of FIG. 3, which forms carbides from liquids and does not meet the microstructural and thermodynamic criterial discussed herein, this would be measured as the mole faction of VC at the solidus [302] or 3.2%. In the alloy of FIG. 2, there is no carbide phase present at the solidus so the carbide mole fraction is 0%.

In some embodiments the carbide mole fraction of the alloy can be ≤5% (or ≤about 5%). In some embodiments the carbide mole fraction of the alloy can be ≤3% (or ≤about 3%). In some embodiments the carbide mole fraction of the alloy can be ≤2% (or ≤about 2%). In some embodiments the carbide mole fraction of the alloy can be ≤1% (or ≤about 1%). In some embodiments the carbide mole fraction of the alloy can be ≤0.5% (or ≤about 0.5%). In some embodiments the carbide mole fraction of the alloy can be ≤0.25% (or ≤about 0.25%). In some embodiments the carbide mole fraction of the alloy can be ≤0.10% (or ≤about 0.10%). In some embodiments the carbide mole fraction of the alloy can be 0% (or about 0%).

The sixth thermodynamic criteria is the total hardphase fraction of the alloy. This is defined as the sum of all borides, carbides, borocarbides, and nitrides measured under equilibrium solidification conditions at 1300K. This criteria can allow the prediction of the wear resistance of a given alloy as higher hardphase fraction generally leads to improved wear resistance.

In FIG. 2, this is measured as the sum of complex borides [201] 9.9% and chromium borides [202] 26% yielding a total hardphase mole fraction of 35.9%.

In some embodiments, the total hardphase mole fraction of the alloy can be between 15 and 55% (or between about 15 and about 55%). In some embodiments, the total hardphase mole fraction of the alloy can be between 25 and 45% (or between about 25 and about 45%). In some embodiments, the total hardphase mole fraction of the alloy can be between 35 and 55% (or between about 35 and about 55%).

In some embodiments, the total hardphase mole fraction of the alloy can be between 35 and 45% (or between about 35 and about 45%).

The seventh thermodynamic criteria is the weight percent of chromium in the ferrous matrix measured at 1300K during equilibrium solidification. Chromium is an alloying constituent which can contribute to the corrosion resistance of an alloy in various environments. Having a chromium free or low chromium matrix may be detrimental to the performance of alloys described in this disclosure where corrosion is a significant factor, especially where erosion/corrosion and/or abrasion/corrosion synergies contribute significantly to premature failure of conventional materials. Conversely, excessive chromium can destabilize the austenitic phase during solidification promoting the formation of a ferritic matrix. Ferritic matrices may be non-advantageous due to their lower hardness compared to predominantly martensitic and/or bainitic matrices.

The weight percent of chromium in the matrix phase is measured at 1300K during equilibrium solidification conditions. In FIG. 2, the matrix phase present is an austenitic FCC phase [204] has 1.5 wt. % chromium.

In embodiments, the weight percent of chromium in the matrix can be between 1 and 25 wt. % (or between about 1 and about 25 wt. %). In some embodiments, the weight percent of chromium in the matrix can be between 3 and 20 wt. % (or between about 3 and about 20 wt. %). In some embodiments, the weight percent of chromium in the matrix can be between 5 and 15 wt. % (or between about 5 and about 15 wt. %). In some embodiments, the weight percent of chromium in the matrix can be between 5 and 12 wt. % (or between about 5 and about 12 wt. %).

The eighth thermodynamic criteria is the weight percent of carbon in the matrix at 1300K during equilibrium solidification conditions. Controlling the level of carbon in the matrix can be advantageous for several reasons. 1) A high enough level of carbon is necessary to form a sufficiently hard martensitic matrix; 2) Excessive carbon in the matrix may lead to undesirable levels of retained austenite; and 3) Excessive carbon promotes the formation of borocarbide phases in this alloy system that can reduce toughness and impact resistance.

The weight percent of carbon in the matrix phase is measured at 1300K during equilibrium solidification conditions. In FIG. 2, the matrix phase present is an austenitic FCC phase [204] that includes 0.3 wt. % carbon. This could also represent, but does not necessarily define, the carbon % in liquid. The free carbon can occur without forming carbides as the carbon can be soluble in iron solid solution and may also substitute for some of the boron in borides.

In some embodiments, the weight percent of carbon in the matrix can be between 0 and 0.45 wt. % (or between about 0 and about 0.45 wt. %). In some embodiments, the weight percent of carbon in the matrix can be between 0.05 and 0.45 wt. % (or between about 0.05 and about 0.45 wt. %). In some embodiments, the weight percent of carbon in the matrix can be between 0.1 and 0.42 wt. % (or between about 0.1 and about 0.42 wt. %). In some embodiments, the weight percent of carbon in the matrix can be between 0.15 and 0.4 wt. % (or between about 0.15 and about 0.4 wt. %). In some embodiments, the weight percent of carbon in the matrix can be between 0.2 and 0.37 wt. % (or between about 0.2 and about 0.37 wt. %).

An additional thermodynamic criteria, at or near equilibrium solidification conditions, can track the difference between boride formation temperatures and the liquidus. Alloys in this disclosure comprise two crystallographically and chemically distinct borides that form close to the liquidus temperature. This can give a fine grained structure good for wear and impact conditions in service. Specifically excluded from this criteria are formation temperatures of carbides. This criteria is to be known as "boride/liquidus melt range". Where the first boride to form from the liquid during solidification is "Boride 1" and the second boride to form from the liquid is "Boride 2".

This criteria can be defined as the maximum difference between each of 2 boride formation temperatures and the liquidus, in absolute value. For example, in the solidification diagram of X18 alloy (FIG. 2), Boride 1 ($M_3B_2$ formed at about 1500K) formation temperature [206] minus liquidus [203] (0 degK) and Boride 2 ($Cr_2B$ formed at around 1450K) formation temperature [207] minus liquidus [203] (50 degK) would be calculated in absolute value. The maximum value is 50 degK so boride/liquidus melt range would be 50 degK. The FCC matrix can be formed around 1500K. In FIG. 3 no "Boride 2" forms so the value of boride/liquidus melt range is infinite.

In some embodiments the boride/liquidus melt range can be ≤150K (or ≤about 150K). In some embodiments the boride/liquidus melt range can be ≤125K (or ≤about 125K). In some embodiments the boride/liquidus melt range can be ≤100K (or ≤about 100K). In some embodiments the boride/liquidus melt range can be ≤75K (or ≤about 75K). In some embodiments the boride/liquidus melt range can be ≤50K (or ≤about 50K). In some embodiments the boride/liquidus melt range can be ≤25K (or ≤about 25K).

Applications and Processes for Use:

The alloys described in this patent can be used in a variety of applications and industries. Some non-limiting examples of applications of use include:

Surface mining applications include the following components and coatings for the following components: Wear resistant sleeves and/or wear resistant hardfacing for slurry pipelines, mud pump components including pump housing or impeller or hardfacing for mud pump components, ore feed chute components including chute blocks or hardfacing of chute blocks, separation screens including but not limited to rotary breaker screens, banana screens, and shaker screens, liners for autogenous grinding mills and semi-autogenous grinding mills, ground engaging tools and teeth and hardfacing for ground engaging tools and teeth, shrouds and adapters, wear plate and rock boxes including for buckets and dumptruck liners, heel blocks and hardfacing for heel blocks on mining shovels, grader blades and hardfacing for grader blades, stacker reclaimers, sizer crushers, jaw crushers, ripper teeth, cutting edges, general wear packages for mining components and other comminution components.

Downstream oil and gas applications include the following components and coatings for the following components: Downhole casing and downhole casing, drill pipe and coatings for drill pipe including hardbanding, mud management components, mud motors, fracking pump sleeves, fracking impellers, fracking blender pumps, stop collars, drill bits and drill bit components, directional drilling equipment and coatings for directional drilling equipment including stabilizers and centralizers, blow out preventers and coatings for blow out preventers and blow out preventer components including the shear rams, oil country tubular goods and coatings for oil country tubular goods.

Upstream oil and gas applications include the following components and coatings for the following components: Process vessels and coating for process vessels including steam generation equipment, amine vessels, distillation towers, cyclones, catalytic crackers, general refinery piping, corrosion under insulation protection, sulfur recovery units, convection hoods, sour stripper lines, scrubbers, hydrocarbon drums, and other refinery equipment and vessels.

Pulp and paper applications include the following components and coatings for the following components: Rolls used in paper machines including yankee dryers, through air dryers, and other dryers, calendar rolls, machine rolls, press rolls, winding rolls, digesters, pulp mixers, pulpers, pumps, boilers, shredders, tissue machines, roll and bale handling machines, fiber guidance systems such as deflector blades, doctor blades, evaporators, pulp mills, head boxes, wire parts, press parts, M.G. cylinders, pope reels, winders, vacuum pumps, deflakers, and other pulp and paper equipment, Power generation applications include the following components and coatings for the following components: boiler tubes, precipitators, fireboxes, turbines, generators, cooling towers, condensers, chutes and troughs, augers, bag houses, ducts, ID fans, coal piping, and other power generation components.

Agriculture applications include the following components and coatings for the following components: chutes, base cutter blades, sugar cane harvesting knives, hammers, troughs, primary fan blades, secondary fan blades, augers, components common to mining applications, and other agricultural applications.

Construction applications include the following components and coatings for the following components: cement chutes, cement piping, bag houses, mixing equipment and other construction applications Machine element applications include the following components and coatings for the following components: Shaft journals, hydraulic cylinders, paper rolls, gear boxes, drive rollers, impellers, rebuilding of engine decks, propeller shafts and other shafts, general reclamation and dimensional restoration applications and other machine element applications Steel applications include the following components and coatings for the following components: cold rolling mills, hot rolling mills, wire rod mills, galvanizing lines, continue pickling lines, continuous casting rolls and other steel mill rolls, and other steel applications.

The alloys described in this patent can be produced and or deposited in a variety of techniques effectively. Some non-limiting examples of processes include:

Thermal spray process including those using a wire feedstock such as twin wire arc, spray, high velocity arc spray, combustion spray and those using a powder feedstock such as high velocity oxygen fuel, high velocity air spray, plasma spray, detonation gun spray, and cold spray. Wire feedstock can be in the form of a metal core wire, solid wire, or flux core wire. Powder feedstock can be either a single homogenous alloy or a combination of multiple alloy powder which result in the desired chemistry when melted together.

Welding processes including those using a wire feedstock including but not limited to metal inert gas (MIG) welding, tungsten inert gas (TIG) welding, arc welding, submerged arc welding, open arc welding, bulk welding, laser cladding, and those using a powder feedstock including but not limited to laser cladding and plasma transferred arc welding. Wire feedstock can be in the form of a metal core wire, solid wire, or flux core wire. Powder feedstock can be either a single homogenous alloy or a combination of multiple alloy powder which result in the desired chemistry when melted together.

Casting processes including processes typical to producing cast iron including but not limited to sand casting, permanent mold casting, chill casting, investment casting, lost foam casting, die casting, centrifugal casting, glass casting, slip casting and process typical to producing wrought steel products including continuous casting processes.

Post processing techniques including but not limited to rolling, forging, surface treatments such as carburizing, nitriding, carbonitriding, heat treatments including but not limited to austenitizing, normalizing, annealing, stress relieving, tempering, aging, quenching, cryogenic treatments, flame hardening, induction hardening, differential hardening, case hardening, decarburization, machining, grinding, cold working, work hardening, and welding From the foregoing description, it will be appreciated that inventive products and approaches for reduced carbide ferrous alloys are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A feedstock material, comprising:
    Fe;
    B: about 7.5 wt. % to about 8.8 wt. %;
    C: about 0.1 wt. % to about 1.0 wt. %;
    Cr: about 18 wt. % to about 26 wt. %; and
    Mo: about 17 wt. % to about 25 wt. %;
    wherein the feedstock material is configured to form a coating on a substrate, the coating comprising:
        a martensitic matrix,
        a first type of borides comprising one or both of $M_2B$ and $M_3B_2$, wherein M comprises one or both of Mo and W,
        a second type of borides comprising one or both of $Cr_2B$ and $(Fe,Cr)_2B$, and
        one or more other phases other than a martensite and the first and second types of borides and having a hardness greater than 1000 HV, wherein the one or more other phases is present in the coating in an amount less than about 10 mole %.

2. The feedstock material of claim 1, wherein the coating comprises less than about 10 mole % of hypereutectic hard phases.

3. The feedstock material of claim 1, wherein the coating comprises between about 5 and 50 mole % of a combined amount of the first type of borides, the second type of borides, and the one or more other phases.

4. The feedstock material of claim 1, wherein the coating comprises less than about 1 mole % of primary carbides.

5. The feedstock material of claim 1, wherein the feedstock material comprises a powder.

6. The feedstock material of claim 1, wherein the feedstock material comprises a wire.

7. The feedstock material of claim 6, wherein the wire comprises a flux core wire or a metal core wire.

8. The feedstock material of claim 1, wherein the coating comprises between about 5 and 50 mole % of the first type of borides.

9. The feedstock material of claim 1, wherein the coating comprises between about 5 and 50 mole % of the second type of borides.

10. The feedstock material of claim 1, wherein the one or more other phases comprise one or both of $M_{23}(C,B)_6$ and $M_7C_3$.

11. A method of forming a hardfacing coating onto a substrate, the method comprising:
    providing a feedstock material, wherein the feedstock material comprises:
        Fe;
        B: about 7.5 wt. % to about 8.8 wt. %;
        C: about 0.1 wt. % to about 1.0 wt. %;
        Cr: about 18 wt. % to about 26 wt. %; and
        Mo: about 17 wt. % to about 25 wt. %; and
    applying the feedstock material to the substrate to form the coating, wherein the coating comprises:
        a martensitic matrix,
        a first type of borides comprising one or both of $M_2B$ and $M_3B_2$, wherein M comprises one or both of Mo and W,
        a second type of borides comprising one or both of $Cr_2B$ and $(Fe,Cr)_2B$, and
        one or more other phases other than a martensite and the first and second types of borides and having a hardness greater than 1000 HV, wherein the one or more other phases is present in the coating in an amount less than about 10 mole %.

12. The method of claim 11, wherein the feedstock material comprises a powder.

13. The method of claim 11, wherein the feedstock material comprises a wire.

14. The method of claim 13, wherein the wire comprises a flux core wire or a metal core wire.

15. The method of claim 11, wherein applying the feedstock to the substrate comprises thermal spraying the feedstock material to the substrate.

16. The method of claim 11, wherein applying the feedstock to the substrate comprises bulk welding the feedstock material to the substrate.

17. A feedstock material, comprising:
    Fe;
    B: about 7.5 wt. % to about 8.8 wt. %;
    C: about 0.1 wt. % to about 1.0 wt. %;
    Cr: about 18 wt. % to about 26 wt. %; and
    Mo: about 17 wt. % to about 25 wt. %;
    wherein the feedstock material is configured to form an alloy, the alloy comprising:
        a martensitic matrix,
        a first type of borides comprising one or both of Mo and W, wherein the first type of borides make up between about 5 and about 50 volume % of the alloy,
        a second type of borides comprising one or both of Fe and Cr, wherein the second type of borides make up between about 5 and about 50 volume % of the alloy, and one or more other phases other than a martensite and the first and second types of borides and having a hardness greater than 1000 HV, wherein the one or more other phases is present in the alloy in an amount less than about 10 volume %.

18. The feedstock material of claim 17, wherein the alloy comprises between 15 and 55 volume % of a combined volume of the first type of borides, the second type of borides, and the one or more other phases.

19. The feedstock material of claim 17, wherein the alloy comprises less than about 20 volume % of hypereutectic hard phases.

20. The feedstock material of claim 17, wherein the feedstock material comprises a powder.

* * * * *